United States Patent
Huang et al.

(10) Patent No.: US 11,856,542 B2
(45) Date of Patent: Dec. 26, 2023

(54) SYSTEM, TAG AND METHOD OF PERFORMING LOCATION TRACKING WITH ULTRA WIDEBAND (UWB)

(71) Applicant: National Yang Ming Chiao Tung University, Hsinchu (TW)

(72) Inventors: Ching Yao Huang, Hsinchu (TW); Stephen Masih, Hsinchu (TW); Shakeb Ameen, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 18 days.

(21) Appl. No.: 17/830,659

(22) Filed: Jun. 2, 2022

(65) Prior Publication Data
US 2023/0043248 A1    Feb. 9, 2023

Related U.S. Application Data

(60) Provisional application No. 63/229,710, filed on Aug. 5, 2021.

(51) Int. Cl.
*H04W 56/00* (2009.01)
*H04W 74/06* (2009.01)
(Continued)

(52) U.S. Cl.
CPC ....... *H04W 56/002* (2013.01); *G01S 13/0209* (2013.01); *H04B 1/7163* (2013.01); *H04W 4/029* (2018.02); *H04W 74/06* (2013.01)

(58) Field of Classification Search
CPC ......... H04W 72/1205; H04W 72/1263; H04W 72/1289; H04W 92/18; H04W 72/1242;
(Continued)

(56) References Cited

U.S. PATENT DOCUMENTS

| 10,627,474 B1* | 4/2020 | Kratz ................... G01S 5/0289 |
| 2007/0139200 A1* | 6/2007 | Yushkov .............. H04B 1/0003 340/8.1 |

(Continued)

FOREIGN PATENT DOCUMENTS

| CN | 111190137 A | 5/2020 | |
| EP | 1065819 A1 | 1/2001 | |
| WO | WO-2021228946 A1 * | 11/2021 | ............... G01S 1/02 |

OTHER PUBLICATIONS

Office Action issued by (TIPO) Intellectual Property Office Ministry of Economic Affairs R.O.C. dated Feb. 1, 2023 for Application No. 111129385, Taiwan.

*Primary Examiner* — Nathan S Taylor
(74) *Attorney, Agent, or Firm* — Locke Lord LLP; Tim Tingkang Xia, Esq.

(57) ABSTRACT

Systems and methods of performing location tracking with ultra wideband (UWB) are provided. The system includes a network formed by base stations and tags. In operation, the system configures multiple Time Division Multiple Access (TDMA) slots within a predetermined time frame. The TDMA slots include a clock calibration packet (CCP) slot, personal area network (PAN) identifier request and response slots, and TDMA tag slots. In the CCP slot, clock synchronization is performed among the base stations and the tags. In the PAN identifier request and response slots, the base stations receive reservation requests from the tags, and send correspond reservation responses. In each TDMA tag slot, the base stations listen to ranging requests from each tag, and send corresponding ranging responses with corresponding timestamps indicating the corresponding TDMA tag slot for each tag. Each tag only wakes up during the corresponding TDMA tag slot, thus achieving low power consumption.

20 Claims, 16 Drawing Sheets

(51) Int. Cl.
*G01S 13/02* (2006.01)
*H04B 1/7163* (2011.01)
*H04W 4/029* (2018.01)

(58) Field of Classification Search
CPC . H04W 72/1268; H04W 72/12; H04W 72/10; H04W 4/029; H04W 56/002; H04W 74/06; H04W 56/00; H04L 1/1812; H04L 5/00; G01S 13/0209; G01S 13/26; G01S 13/765; G01S 13/767; G01S 13/878; G01S 7/0235; G01S 13/02; H04B 1/7163
See application file for complete search history.

(56) References Cited

U.S. PATENT DOCUMENTS

| | | | | |
|---|---|---|---|---|
| 2008/0101329 | A1* | 5/2008 | Richards | G01S 13/76 370/347 |
| 2008/0248813 | A1* | 10/2008 | Chatterjee | G01S 5/02524 455/456.2 |
| 2009/0239550 | A1* | 9/2009 | Myers | G01S 13/767 455/456.1 |
| 2010/0148925 | A1* | 6/2010 | Kaplan | G06K 7/10306 375/E1.002 |
| 2012/0242501 | A1* | 9/2012 | Tran | A61B 5/742 340/870.02 |
| 2023/0084106 | A1* | 3/2023 | Sobol | G08B 21/22 340/5.61 |

* cited by examiner

SYSTEM, TAG AND METHOD OF PERFORMING LOCATION TRACKING WITH ULTRA WIDEBAND (UWB)

CROSS-REFERENCE TO RELATED APPLICATIONS

This non-provisional application claims priority to and the benefit of, pursuant to 35 U.S.C. § 119(e), U.S. provisional patent application Ser. No. 63/229,710, filed Aug. 5, 2021, which is incorporated herein in its entirety by reference.

TECHNICAL FIELD

The disclosure relates generally to location tracking technology, and more particularly to a system and a method of performing three-dimensional high speed, centimeter accurate location tracking with ultra wideband (UWB).

BACKGROUND

The background description provided herein is for the purpose of generally presenting the context of the present disclosure. The subject matter discussed in the background of the disclosure section should not be assumed to be prior art merely as a result of its mention in the background of the disclosure section. Similarly, a problem mentioned in the background of the disclosure section or associated with the subject matter of the background of the disclosure section should not be assumed to have been previously recognized in the prior art. The subject matter in the background of the disclosure section merely represents different approaches, which in and of themselves may also be disclosures.

The indoor positioning system and real-time location system facilitate locating objects in the physical world. There have been many technologies used for positioning items in space, such as Bluetooth and Wi-Fi based or Ultrasound and Radar based real-time locating systems (RTLS). There are multiple underlying methods used by different radios, such as fingerprinting, time of flight, Received Signal Strength Indicator (RSSI) and channel state information technology. While these methods and the corresponding technologies are useful in terms of availability and work under non-licensed bands, they cannot solve very critical positioning requirements such as high positioning accuracy, high speed projectile tracking and real-time use cases. Another issue with the open frequency being used by RTLS is that they are very prone to interferences from metallic environments and susceptible to signal jammers.

Therefore, a heretofore unaddressed need exists in the art to address the aforementioned deficiencies and inadequacies.

SUMMARY

In one aspect, the disclosure relates to a system of performing location tracking with ultra wideband (UWB). In one embodiment, the system includes a network formed by a plurality of base stations communicatively connected to one another and to a plurality of tags, wherein one of the base stations is configured as a master base station and each of remaining ones of the base stations is configured as a slave base station, and each of the base stations has a processor and a non-transitory storage device storing first computer executable code. The first computer executable code, when executed at the processor of each of the base stations, causes the processor of each of the base stations to perform: configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots for the tags; creating a plurality of timers for the TDMA slots, wherein each of the timers is configured to indicate time of one of the TDMA slots; in the CCP slot, performing clock synchronization among the base stations; in the PAN identifier request slot, for the master base station, listening for a reservation request from each of the slave base station and the tags; and for the slave base station, sending the reservation request to the master base station, and relaying the reservation request from the tags to the master base station; in the PAN identifier response slot, for the master base station, in response to the reservation request received from each of the slave base station and the tags, recording each of the slave base station and the tags, assigning a corresponding TDMA tag slot to each of the tags sending the reservation request, and sending a corresponding reservation response respectively to each of the slave base station and the tags; and for the slave base station, receiving the corresponding reservation response from the master base station; and in each of the TDMA tag slots, listening to ranging requests from the tags, and in response to receiving a corresponding ranging request from a corresponding tag of the tags, sending a corresponding ranging response to the corresponding tag with a corresponding timestamp indicating the time of a TDMA tag slot corresponding to the corresponding tag.

In certain embodiments, the predetermined time frame is 1 second, a quantity of the TDMA time slots within the predetermined time frame is 160, and the time of each of the TDMA time slots is 6300 microseconds.

In certain embodiments, the first computer executable code, when executed at the processor of each of the base stations, causes the processor of each of the base stations to further perform: defining a plurality of callbacks, wherein the callbacks one-to-one corresponds to the TDMA slots; and in response to the timers indicating beginning of the time of each of the TDMA slots, triggering a corresponding one of the callbacks corresponding to the TDMA slots for the base stations and the tags.

In certain embodiments, each of the tags has a processor, a real-time clock (RTC) and a non-transitory storage device storing second computer executable code, and wherein the second computer executable code, when executed at the processor of a specific tag of the tags, causes the processor of the specific tag to perform: in the CCP slot, performing perform clock synchronization among the base stations and the specific tag; in the PAN identifier request slot, sending the reservation request to the base stations; in the PAN identifier response slot, receiving the corresponding reservation request from the base stations; and in each of the TDMA tag slots, sending the corresponding ranging request to the base stations within the TDMA tag slot corresponding to the specific tag; receiving the corresponding ranging response with the corresponding timestamp from the base stations; calculating a wake-up time based on the corresponding timestamp, wherein the wake-up time is a time period prior to the time of the TDMA tag slot corresponding to the specific tag; entering a deep sleep mode, wherein the RTC remains active in the deep sleep mode; and in response to the RTC indicating the wake-up time, waking up from the deep sleep mode, performing location calculation to obtain the locating information within the TDMA tag slot corresponding to the specific tag, and re-entering the deep sleep mode after the TDMA tag slot corresponding to the specific tag.

In certain embodiments, the first computer executable code, when executed at the processor of each of the base stations, causes the processor of each of the base stations to perform clock synchronization among the base stations in the CCP slot by: for the master base station, transmitting a clock synchronization packet; and for the slave base station, receiving the clock synchronization packet from the master base station, synchronizing a local clock of the slave base station with reference to the master base station based on information of the clock synchronization packet, and relaying the clock synchronization packet.

In certain embodiments, the second computer executable code, when executed at the processor of the specific tag, causes the processor of the specific tag to perform clock synchronization among the base stations and the specific tag in the CCP slot by receiving the clock synchronization packet from the base stations, and synchronizing a local clock of the specific tag with reference to the master base station based on the information of the clock synchronization packet.

In certain embodiments, the wake-up time is 250 microseconds prior to the time of the TDMA tag slot corresponding to the specific tag.

In certain embodiments, the second computer executable code, when executed at the processor of the specific tag, causes the processor of the specific tag to further perform: configuring a plurality of node slots within the TDMA tag slot corresponding to the specific tag, wherein the node slots sequentially includes a group poll slot, a plurality of base station response slots, a location calculation slot, and a data uplink slot; and within the TDMA tag slot corresponding to the specific tag, sending the corresponding ranging request to the base stations by a group poll within the group poll slot; receiving the corresponding ranging response from each of the base stations within a corresponding one of the base station response slots; performing location calculation to obtain the locating information within the location calculation slot; and uploading the locating information obtained within the data uplink slot.

In certain embodiments, a quantity of the base station response slots within the TDMA tag slot corresponding to the specific tag is 16, the time of TDMA tag slot corresponding to the specific tag is 6300 microseconds, time of the group poll slot is 200 microseconds, and overall time of the base station response slots is 4500 microseconds.

Another aspect of the disclosure relates to a tag of performing location tracking with UWB, which includes a processor, a real-time clock (RTC) and a non-transitory storage device storing computer executable code. The tag is communicatively connected to a network formed by a plurality of base stations, wherein one of the base stations is configured as a master base station and each of remaining ones of the base stations is configured as a slave base station. The computer executable code, when executed at the processor of the tag, causes the processor of the tag to perform: configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots; creating a plurality of timers for the TDMA slots, wherein each of the timers is configured to indicate time of one of the TDMA slots; in the CCP slot, performing perform clock synchronization among the base stations and the tag; in the PAN identifier request slot, sending a reservation request to the base stations, wherein the base stations are configured to assign a corresponding TDMA tag slot to the tag in response to the reservation request; in the PAN identifier response slot, receiving the corresponding reservation request from the base stations; and in each of the TDMA tag slots, sending the corresponding ranging request to the base stations within the TDMA tag slot corresponding to the tag, wherein the base stations are configured to send a corresponding ranging response to the tag with a corresponding timestamp indicating the time of the TDMA tag slot corresponding to the corresponding tag; receiving the corresponding ranging response with the corresponding timestamp from the base stations; calculating a wake-up time based on the corresponding timestamp, wherein the wake-up time is a time period prior to the time of the TDMA tag slot corresponding to the tag; entering a deep sleep mode, wherein the RTC remains active in the deep sleep mode; and in response to the RTC indicating the wake-up time, waking up from the deep sleep mode, performing location calculation to obtain locating information within the TDMA tag slot corresponding to the tag, and re-entering the deep sleep mode after the TDMA tag slot corresponding to the tag.

In certain embodiments, the computer executable code, when executed at the processor of the tag, causes the processor of the tag to perform clock synchronization among the base stations and the tag in the CCP slot by receiving a clock synchronization packet from the base stations, and synchronizing a local clock of the tag with reference to the master base station based on the information of the clock synchronization packet.

In certain embodiments, the clock synchronization packet is transmitted by the master base station or is relayed by the slave base station.

In certain embodiments, the wake-up time is 250 microseconds prior to the time of the TDMA tag slot corresponding to the specific tag.

In certain embodiments, the computer executable code, when executed at the processor of the tag, causes the processor of the tag to further perform: configuring a plurality of node slots within the TDMA tag slot corresponding to the tag, wherein the node slots sequentially includes a group poll slot, a plurality of base station response slots, a location calculation slot, and a data uplink slot; and within the TDMA tag slot corresponding to the tag, sending the corresponding ranging request to the base stations by a group poll within the group poll slot; receiving the corresponding ranging response from each of the base stations within a corresponding one of the base station response slots; performing location calculation to obtain the locating information within the location calculation slot; and uploading the locating information obtained within the data uplink slot.

In certain embodiments, a quantity of the base station response slots within the TDMA tag slot corresponding to the specific tag is 16, the time of TDMA tag slot corresponding to the tag is 6300 microseconds, time of the group poll slot is 200 microseconds, and overall time of the base station response slots is 4500 microseconds.

In a further aspect of the disclosure, a method of performing location tracking with UWB is provided. The method includes: providing a network formed by a plurality of base stations communicatively connected to one another and to a plurality of tags, wherein one of the base stations is configured as a master base station and each of remaining ones of the base stations is configured as a slave base station;

configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots for the tags; creating a plurality of timers for the TDMA slots, wherein each of the timers is configured to indicate time of one of the TDMA slots; in the CCP slot, performing clock synchronization among the base stations and the tags; in the PAN identifier request slot, for the master base station, listening for a reservation request from each of the slave base station and the tags; and for the slave base station, sending the reservation request to the master base station, and relaying the reservation request from the tags to the master base station; in the PAN identifier response slot, for the master base station, in response to the reservation request received from each of the slave base station and the tags, recording each of the slave base station and the tags, assigning a corresponding TDMA tag slot to each of the tags sending the reservation request, and sending a corresponding reservation response respectively to each of the slave base station and the tags; and for the slave base station, receiving the corresponding reservation response from the master base station; and in each of the TDMA tag slots, listening, by the base stations, to ranging requests from the tags, and in response to receiving a corresponding ranging request from a corresponding tag of the tags, sending a corresponding ranging response to the corresponding tag with a corresponding timestamp indicating the time of a TDMA tag slot corresponding to the corresponding tag.

In certain embodiments, the method further includes: defining a plurality of callbacks, wherein the callbacks one-to-one corresponds to the TDMA slots; and in response to the timers indicating beginning of the time of each of the TDMA slots, triggering a corresponding one of the callbacks corresponding to the TDMA slots for the base stations and the tags.

In certain embodiments, the clock synchronization among the base stations in the CCP slot is performed by: for the master base station, transmitting a clock synchronization packet; for the slave base station, receiving the clock synchronization packet from the master base station, synchronizing a local clock of the slave base station with reference to the master base station based on information of the clock synchronization packet, and relaying the clock synchronization packet; and for each of the tags, receiving the clock synchronization packet from the base stations, and synchronizing a local clock of each of the tags with reference to the master base station based on the information of the clock synchronization packet.

In certain embodiments, a specific tag of the tags is configured to perform: in the CCP slot, performing clock synchronization among the base stations and the specific tag; in the PAN identifier request slot, sending the reservation request to the base stations; in the PAN identifier response slot, receiving the corresponding reservation request from the base stations; and in each of the TDMA tag slots, sending the corresponding ranging request to the base stations within the TDMA tag slot corresponding to the specific tag; receiving the corresponding ranging response with the corresponding timestamp from the base stations; calculating a wake-up time based on the corresponding timestamp, wherein the wake-up time is a time period prior to the time of the TDMA tag slot corresponding to the specific tag; entering a deep sleep mode, wherein a real-time clock (RTC) of the specific tag remains active in the deep sleep mode; and in response to the RTC indicating the wake-up time, waking up from the deep sleep mode, performing location calculation to obtain the locating information within the TDMA tag slot corresponding to the specific tag, and re-entering the deep sleep mode after the TDMA tag slot corresponding to the specific tag.

In certain embodiments, the specific tag is further configured to perform: configuring a plurality of node slots within the TDMA tag slot corresponding to the tag, wherein the node slots sequentially includes a group poll slot, a plurality of base station response slots, a location calculation slot, and a data uplink slot; and within the TDMA tag slot corresponding to the tag, sending the corresponding ranging request to the base stations by a group poll within the group poll slot; receiving the corresponding ranging response from each of the base stations within a corresponding one of the base station response slots; performing location calculation to obtain the locating information within the location calculation slot; and uploading the locating information obtained within the data uplink slot.

These and other aspects of the present disclosure will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment.

DETAILED DESCRIPTION OF DISCLOSED EMBODIMENTS

Figure 1A:
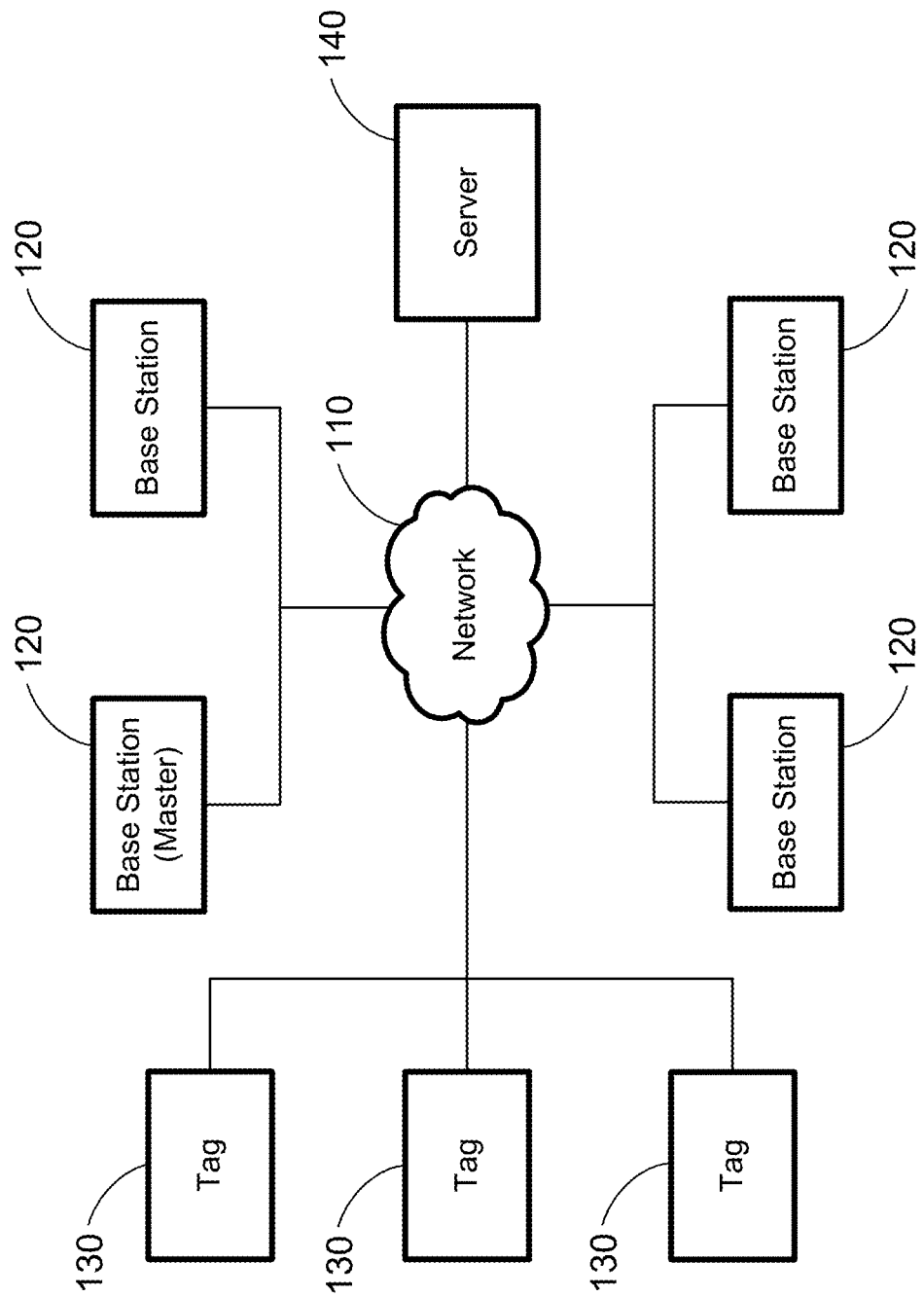
FIG. 1A shows an exemplary system of performing location tracking with ultra wideband (UWB) according to certain embodiments of the disclosure.

The disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this specification, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. It should be understood that one or more steps within a method may be executed in a different order (or concurrently) without altering the principles of the disclosure.

As discussed above, there have been many technologies used for positioning items in space, such as the MTS. With the demand for such technologies in industrial environments and the commercial success, there is a need for improvements in the RTLS. Thus, certain aspects of the disclosure relates to systems and methods performing location tracking with ultra wideband (UWB). Certain embodiments of the disclosure may be used for developing 3D enabled high speed tracking indoor position system or real-time positioning system. Specifically, an exemplary system may be formed by base stations (or "anchors") and tags, in which the tags are attached to the moving objects and the anchors are fixed and stationary. The base stations include a master base station and slave base stations. The master base station is responsible for transmitting clock synchronization packets and giving slot ids to slave base stations and tags. In operation, the master base station starts configuring the Time Division Multiple Access (TDMA) slots, and synchronizes the network, thus allowing other slave base stations to join and form the network, in which each base station (or anchor) functions as a node. The nodes operate using a repeating frame structure of a predetermined time frame, e.g., 1 second, allowing the tags to perform under low powered modes. Specifically, once a tag is synchronized to the network, the tag remains in the deep sleep mode until a wake-up time prior to the assigned TDMA slot for the tag, and performs ranging and locating operations during the assigned TDMA slot. In this case, with the time synchronized setup with all nodes in the network, the system is capable of providing high accuracy micro-location data and performing high speed tracking in near real-time, while avoiding packet collisions and/or packet loss between the base stations. Meanwhile, the low powered tags lead to longer battery life for each tag.

FIG. 1A shows an exemplary system of performing location tracking with UWB according to certain embodiments of the disclosure. As shown in FIG. 1A, the exemplary system 100 includes a network 110, which is formed by a plurality of base stations 120 (or "anchors") and a server 140. The base stations 120 and the server 140 are communicatively connected to one another through the network 110. In addition, a plurality of tags 130 are provided, and each tag 130 is communicatively connected to the base stations 120. It should be noted that, although the exemplary system 100 shows certain quantities of base stations 120 (four base stations 120 as shown in FIG. 1A), tags 130 (three tags 130 as shown in FIG. 1A) and server 140 (a single server 140 as shown in FIG. 1A), the actual quantity of the base stations 120, the tags 130 and the server 140 may vary based on the actual needs of the system 100.

Figure 1B:
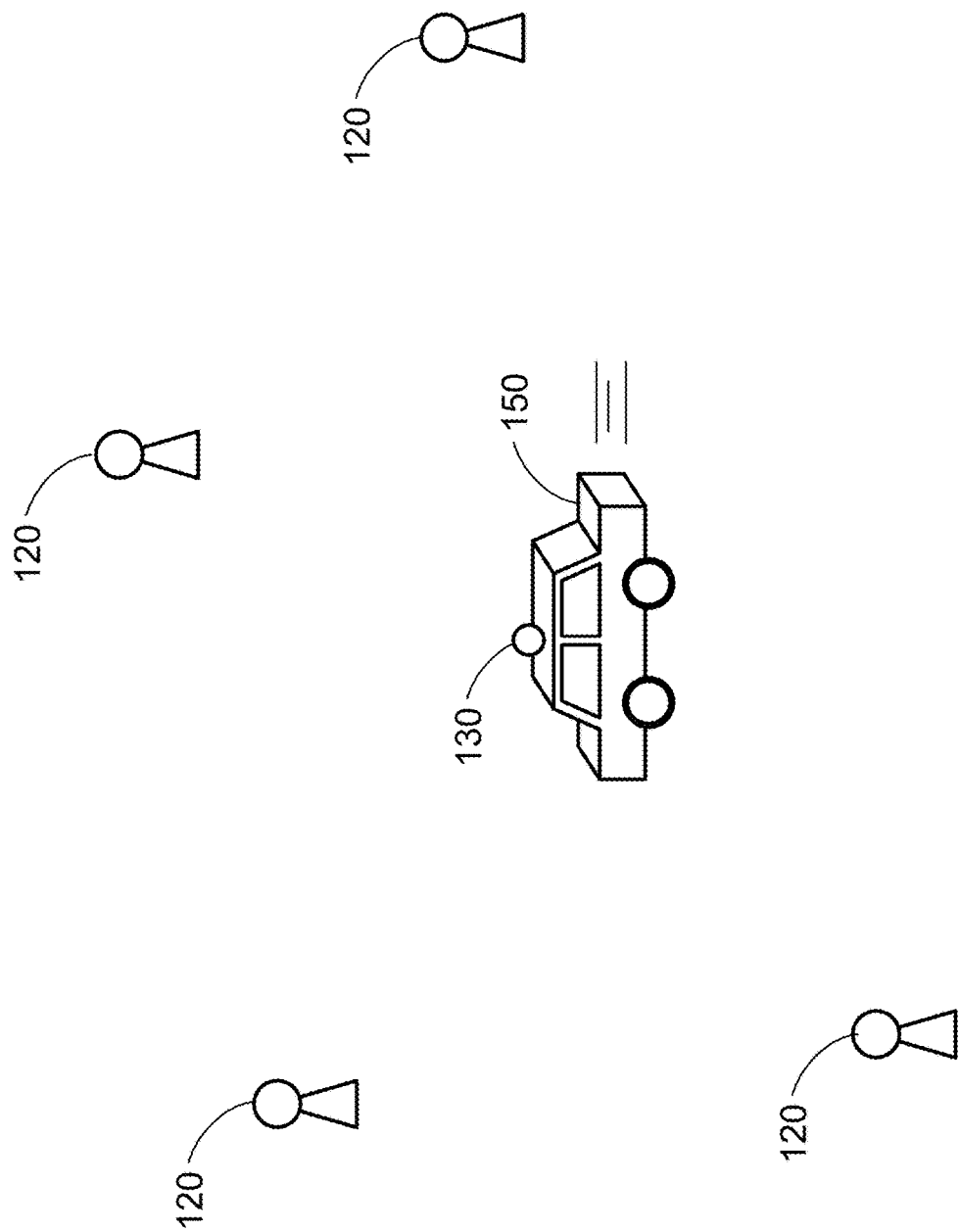
FIG. 1B shows an exemplary environment where the system as shown in FIG. 1A is located according to certain embodiments of the disclosure.

The base stations 120 are provided as stationary or fixed "anchors" in the system 100. In other words, each base station 120 is provided to be stationary in an environment where the system 100 is located, such that the tags 130, when moving around in the environment, may be located based on the fixed locations of the anchors (i.e., the base stations 120) and the detection signals received by the base stations 120 from the tags 130. For example, FIG. 1B shows an exemplary system of performing location tracking with UWB according to certain embodiments of the disclosure. As shown in FIG. 1B, in the environment, a plurality of base stations 120 are provided at certain fixed locations. In this case, a target (such as a vehicle 150) on which a tag 130 is disposed may move around the environment, and the base stations 120 may obtain detecting signals from the tag 130 in order to calculate the location of the target.

In certain embodiments, among the base stations 120 in the system 100, only one base stations 120 is configured as a master base station, while the other base stations 120 in the network 110 are configured as slave base stations. For example, in the exemplary system 100 as shown in FIG. 1A, only one of the four base stations 120 is configured as the master base station, and the other three base stations 120 are slave base stations. In certain embodiments, the role of each base station 120 as either the master base station or the slave base station may be predetermined.

In certain embodiments, as shown in FIG. 1B, due to the fixed location of each base station 120 and the moving location of the tag 130 (or the target on which the tag 130 is disposed), it is possible that the tag 130 may not be located within the range of some of the base stations 120. In other words, the tag 130 may be an out-of-range tag for some of the base stations 120. In this case, the tag 130 may not be able to perform ranging directly with these out-of-range base stations 120. In the case where the tag 130 is located out of the range of the master base station, a relaying process may be required by another slave base station 120 (or multiple slave base stations 120) to transmit/relay the ranging signals between the out-of-range tag 130 and the master base station 120.

The tags 130 are devices provided on the target (which may be a vehicle, a person, an animal or a moving object to be located) to be located in the system 100. In certain embodiments, The server 140 is a server computing device communicatively connected with the base stations 120 through the network 110 to perform the calculation of the actual locations of the tags 130 based on the information provided by the anchors (i.e., the base stations 120). Specifically, the information provided by the base stations 120 include, without being limited thereto, information of the fixed locations of the anchors (i.e., the base stations 120) and the detection signals received by the base stations 120 from the tags 130. In certain embodiments, the server 140 and the base stations 120 may form a centralized network system, in which the server 140 is a centralized server. In certain embodiments, a distributed network system may be provided, with the server 140 (or multiple servers 140) and the base stations 120 being connected in a distributed structure.

Figure 2A:
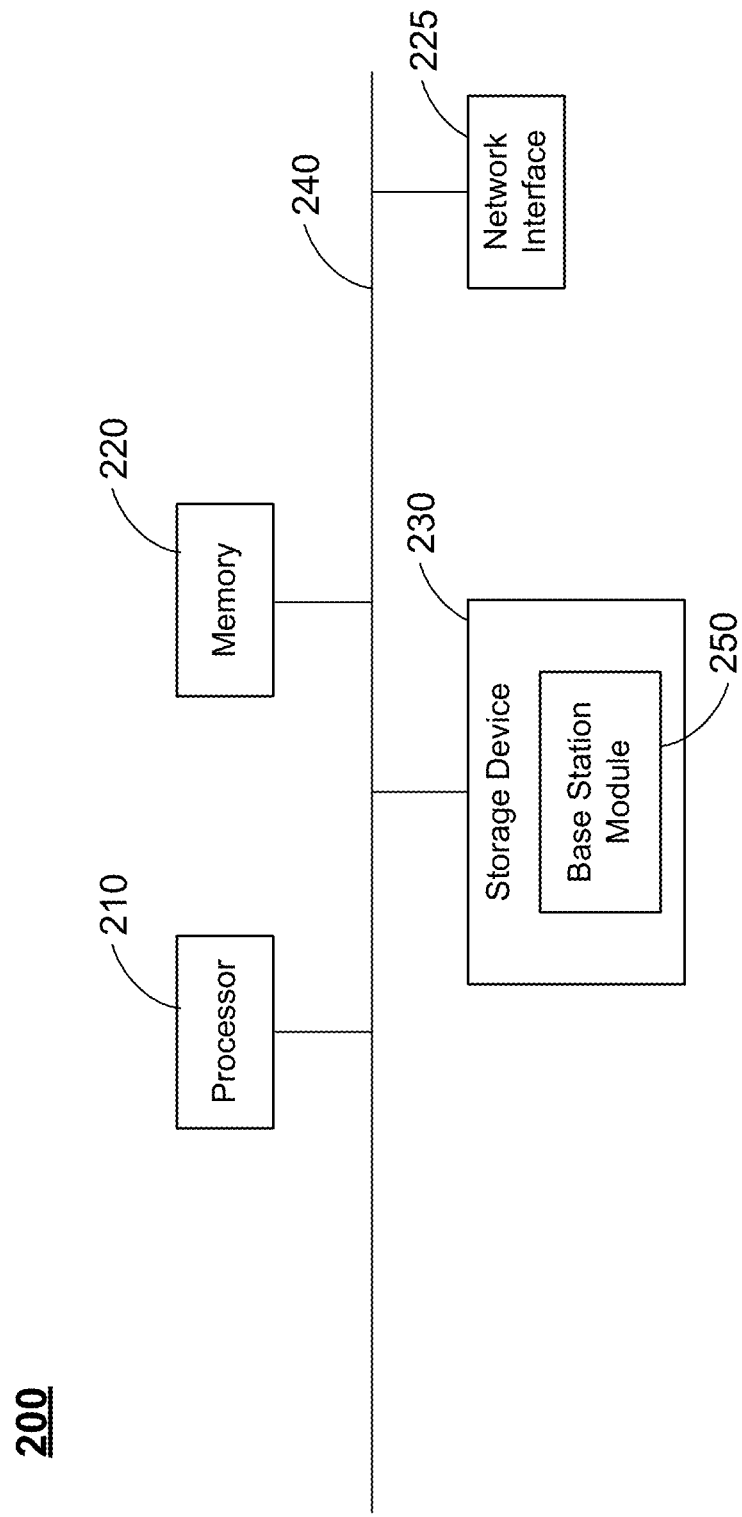
FIG. 2A shows schematically an exemplary base station according to one embodiment of the disclosure.

FIG. 2A shows schematically an exemplary base station according to one embodiment of the disclosure. Specifically, the exemplary base station 200 as shown in FIG. 2A may be used as each of the base stations 120 of the exemplary system 100 as shown in FIG. 1A. As shown in FIG. 2A, the base station 200 includes a processor 210, a memory 220, a network interface 225, and a storage device 230, and a bus 240 interconnecting the processor 210, the memory 220, the network interface 225 and the storage device 230. In one embodiment, the processor 210, the memory 220 and the storage device 230 may be in the form of an ASIC. In certain embodiments, the base station 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 210 controls operation of the base station 200, which may be used to execute any computer executable code or instructions. In certain embodiments, the processor 210 may be a central processing unit (CPU) or a microcontroller unit (MCU), and the computer executable code or instructions being executed by the processor 210 may include an operating system (OS) and other applications, codes or instructions stored in the base station 200. In certain embodiments, the base station 200 may run on multiple processors, which may include any suitable number of processors.

The memory 220 may be a volatile memory module, such as the random-access memory (RAM), for storing the data and information during the operation of the base station 200. In certain embodiments, the memory 220 may be in the form of a volatile memory array. In certain embodiments, the base station 200 may run on more than one memory 220.

The network interface 225 is an interface for communication with the network. In certain embodiments, the network interface 225 may be an interface under the UWB standard. In one embodiment, the base station 200 may include multiple network interfaces 225. For example, the network interface 225 may include an Ethernet backhaul, such as a local area network (LAN) backhaul, that allows the base station 200 to be connected to the server 140, and a wireless interface to be in wireless communication with the tags.

The storage device 230 is a non-volatile storage media or device for storing the computer executable code or instructions, such as the OS and the software applications for the base station 200. Examples of the storage device 230 may include flash memory, memory cards, USB drives, or other types of non-volatile storage devices such as hard drives, floppy disks, optical drives, or any other types of data storage devices. In certain embodiments, the base station 200 may have more than one storage device 230, and the software applications of the base station 200 may be stored in the more than one storage device 230 separately.

Figure 2B:
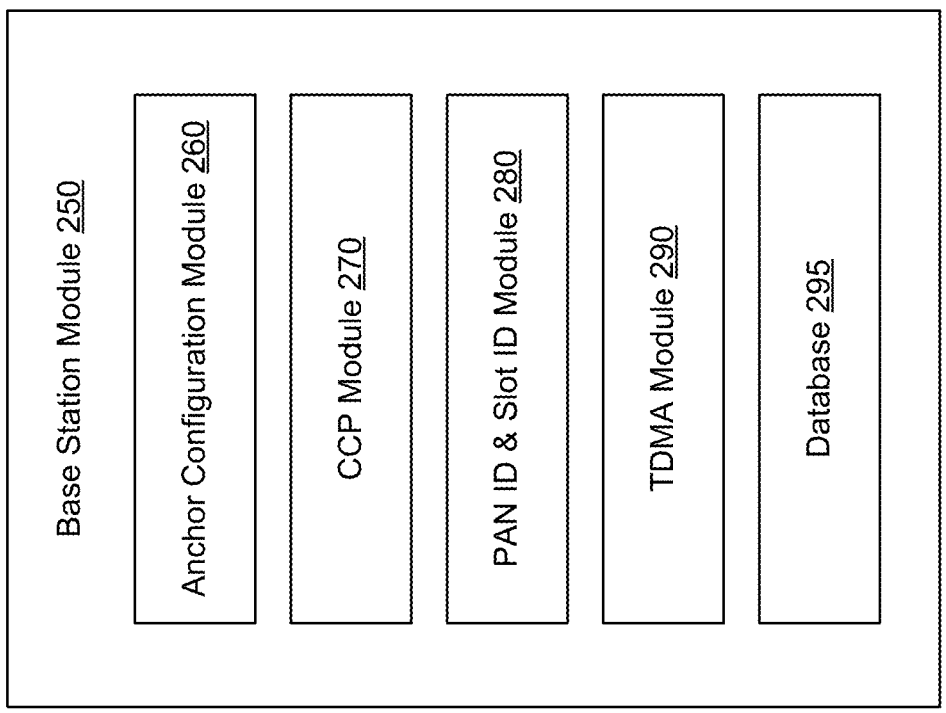
FIG. 2B shows schematically the base station module in the base station as shown in FIG. 2A according to one embodiment of the disclosure.

As shown in FIG. 2A, the computer executable code stored in the storage device 230 may include a base station module 250. Specifically, the base station module 250 is in the form of a software module which, when executed, allows the base station 200 to be in communication with the server and the tags through the base station protocol. FIG. 2B shows schematically the base station module in the base station as shown in FIG. 2A according to one embodiment of the disclosure. Specifically, the base station module 250 as shown in FIG. 2B includes an anchor configuration module 260, a clock calibration packet (CCP) module 270, a personal area network (PAN) identifier (ID) & Slot ID module 280, a TDMA module 290, and a database 295.

The anchor configuration module 260 is used to perform the configuration setting for the base station 200. In particular, when the base station 200 reboots, the anchor configuration module 260 loads the base station configuration data from the database 295 to perform configuration. Based on the base station configuration data, the anchor configuration module 260 configures or assigns a plurality of TDMA slots in the memory 220, and creates a plurality of timers for the TDMA slots. Each of the timers is used to indicate time of one of the TDMA slots. In certain embodiments, the TDMA slots sequentially include a CCP slot, a PAN ID request slot, a PAN ID response slot and a plurality of TDMA tag slots. In one embodiment, within a predetermined time frame such as 1 second, there are 160 TDMA time slots within the 1-second predetermined time frame, and the time of each of the TDMA time slots is 6300 microseconds. Details of the TDMA slots will be further elaborated.

In certain embodiments, the timers may be used to trigger the corresponding TDMA slots using the "callback" mechanism. Specifically, the anchor configuration module 260 may define a plurality of callbacks, and the callbacks one-to-one correspond to the TDMA slots. Then, when the timers indicates beginning of the time of a corresponding TDMA slot, the anchor configuration module 260 may trigger a corresponding callback corresponding to the corresponding TDMA slot. Since all of the base stations and the tags are clock synchronized, the callback mechanism may apply to all of the base stations and the tags, thus accurately indicating the start time of the corresponding TDMA slot.

The CCP module 270 is used to perform clock calibration and synchronization among the base stations 200 and the tags. Specifically, as discussed above, the base stations include a master base station and slave base stations. In certain embodiments, for the master base station, the CCP module 270 is used to transmit or broadcast a clock synchronization packet across the network in the CCP slot. For each slave base station, the CCP module 270 is used to receive the clock synchronization packet from the master base station and to synchronize a local clock of the slave base station with reference to the master base station based on information of the clock synchronization packet in the CCP slot. Thus, all base stations and tags across the network are clock synchronized based on the information of the clock synchronization packet transmitted by the master base station. In certain embodiments, some of the slave base stations may not be located within the range of the master base station, such that these out-of-range slave base stations cannot hear from the master base station directly. In this case, the CCP module 270 of each of the slave base stations located within the range of the master base station may further relay the clock synchronization packet across the network to allow the out-of-range slave base stations to be clock synchronized with the master base station. In certain embodiments, the maximum relay is limited to 127, which covers 16 base station clusters, beyond which the clock drift exceeds above 500 picoseconds. Since the fastest synchronization transition time is about 500 microseconds in the slave base stations, the synchronization accuracy error is about 500 microseconds*1 ppm=500 picoseconds (0.5 ns), which is about 15 cm (in the worst case scenario after the 127 relays).

The PAN ID & slot ID module 280 is used to perform reservation for the base stations and the tags across the network. In certain embodiments, for the master base station, the PAN ID & Slot ID module 280 is used to listen for a reservation request from each of the slave base stations and the tags in the PAN ID request slot, and to respond to each reservation request being received by recording each of the slave base stations and the tags, assigning a corresponding TDMA tag slot to each of the tags sending the reservation request, and sending a corresponding reservation response respectively to each of the slave base station and the tags. The corresponding data for the assigned TDMA tag slots are recorded in the database 295. For each slave base station, the PAN ID & slot ID module 280 is used to send the reservation request to the master base station and relay the reservation request from the tags to the master base station in the PAN ID request slot, and to receive the corresponding reservation response from the master base station in the PAN ID response slot. In certain embodiments, in the case where some of the slave base stations and/or tags are be located within the range of the master base station, the PAN ID & Slot ID module 280 of each of the slave base stations located within the range of the master base station may further relay the reservation request from the out-of-range slave base stations and/or tags to the master base station in the PAN ID request slot, and to relay the corresponding reservation response from the master base station to the out-of-range slave base stations and/or tags in the PAN ID response slot; in the PAN identifier response slot.

In certain embodiments, the PAN ID & slot ID module 280 may utilize a lease time mechanism for the reservation of the slave base stations and the tags. Specifically, when the PAN ID & slot ID module 280 of the master base station sends a corresponding reservation response respectively to each of the slave base station and the tags, the PAN ID & slot ID module 280 also assigns a lease time for each of the slave base station and the tags. checks whether the lease time has expired. For example, the lease time may 3600 seconds (i.e., 1 hour). Once the lease time for a slave base station or a tag has expired, the slot assigned to the slave base station or the tag is released, and is then freely available for all new reservation requests.

The TDMA module 290 is used to control the ranging communication between the base station 200 and the tags. In certain embodiments, in each of the TDMA tag slots, the TDMA module 290 is used to listen to ranging requests from the tags, and in response to receiving a corresponding ranging request from a corresponding tag, the TDMA module 290 sends a corresponding ranging response to the corresponding tag with a corresponding timestamp indicating the time of a TDMA tag slot corresponding to the corresponding tag. In this case, the corresponding tag may perform corresponding wake-up and location calculation process based on the information of the ranging response and the corresponding timestamp.

Figure 3:
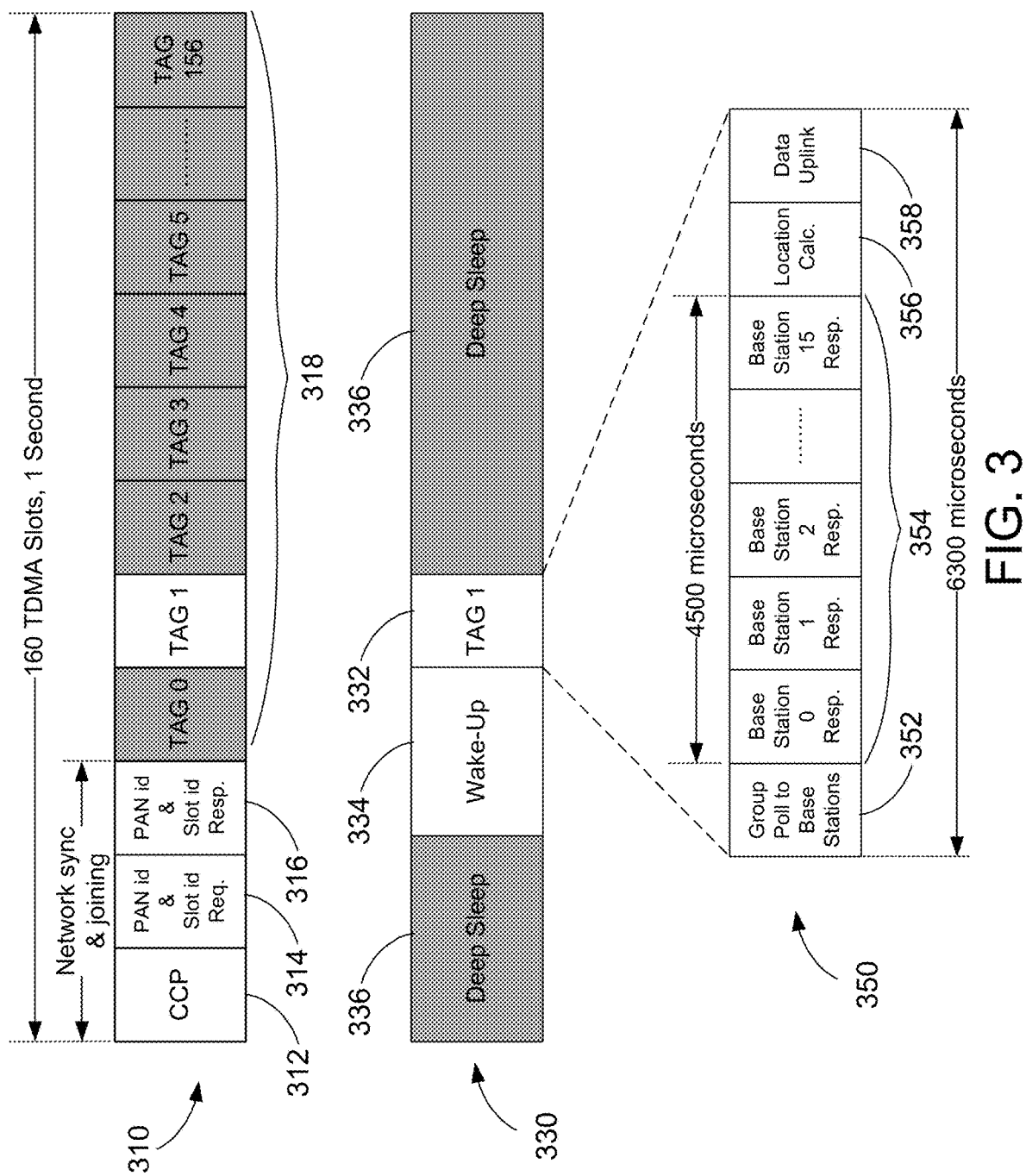
FIG. 3 shows an exemplary frame being spread and synchronized among all nodes of the system according to certain embodiments of the disclosure.

FIG. 3 shows an exemplary frame being spread and synchronized among all nodes of the system according to certain embodiments of the disclosure. Specifically, as described above, the anchor configuration module 260 configures or assigns a plurality of TDMA slots in the memory 220. As shown in FIG. 3, there are 160 TDMA slots 310 within a 1-second predetermined time frame, which sequentially include a CCP slot 312 (as the 0th TDMA slot), a PAN ID request slot 314 and a PAN ID response slot 316 (as the 1st and 2nd TDMA slots), and a plurality of TDMA tag slots 318 (as the 3rd through 159th TDMA slots). In other words, there are 157 TDMA tag slots 318, sequentially being labeled as TAG 0 through TAG 156, and each of the TDMA tag slots 318 may be assigned one-to-one for a corresponding tag, thus allowing a total of 157 tags to join the network. If all 157 TDMA tag slots 318 have been reserved for the tags, the master base station will stop listening for any additional tag request. The first three TDMA slots (i.e., the CCP slot 312, the PAN ID request slot 314 and the PAN ID response slot 316, or the 0th through 2nd TDMA slots) are used for network synchronization and joining purposes, and the TDMA tag slots 318 are used for tag ranging purposes. Further, the time of each of the TDMA time slots 310 is 6300 microseconds, thus allowing each of the tags to have sufficient time to perform ranging with the base stations in the network.

Figure 4A:
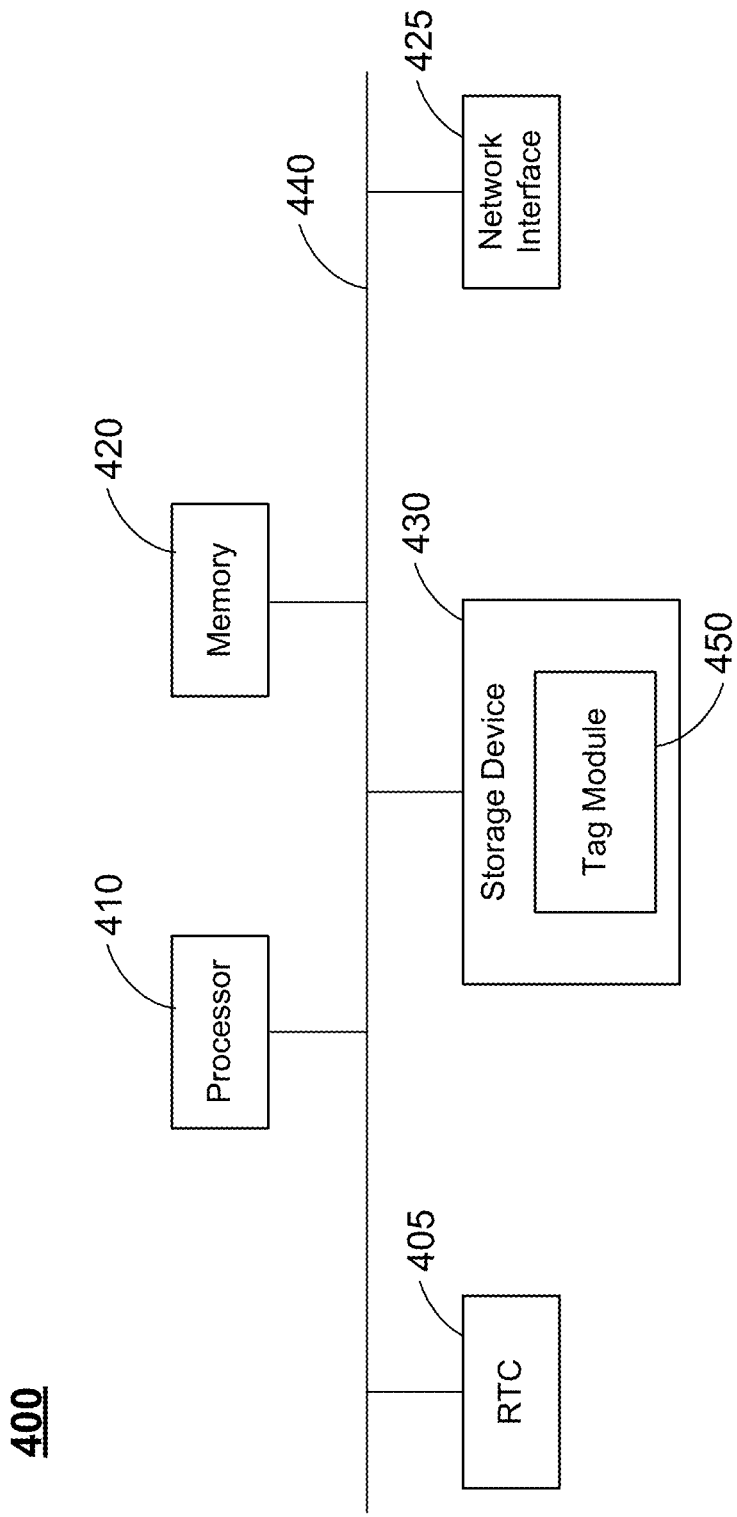
FIG. 4A shows schematically an exemplary tag according to one embodiment of the disclosure.

FIG. 4A shows schematically an exemplary tag according to one embodiment of the disclosure. Specifically, the exemplary tag 400 as shown in FIG. 4A may be used as each of the tags 130 of the exemplary system 100 as shown in FIG. 1A. As shown in FIG. 4A, the tag 400 includes a real-time clock (RTC) 405, a processor 410, a memory 420, a network interface 425, and a storage device 430, and a bus 440 interconnecting the RTC 405, the processor 410, the memory 420, the network interface 425 and the storage device 430. In one embodiment, the processor 410, the memory 420 and the storage device 430 may be in the form of an ASIC. In certain embodiments, the tag 400 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The RTC 405 is a battery-powered clock included in a microchip to store and provide current time for the tag 400. In certain embodiments, the RTC 405 (or the microchip on which the RTC 405 is provided) is separated from the processor 410, the memory 420 and the storage device 430, such that it is operable independently from other components of the tag 400. In other words, the RTC 405 may be in an active status while the other components of the tag 400 switch to a deep sleep mode, thus allowing the tag to consume lower power. In certain embodiments, the RTC 405 may be implemented by a complementary metal-oxide semiconductor (CMOS). in a computer motherboard.

The processor 410 controls operation of the tag 400, which may be used to execute any computer executable code or instructions. In certain embodiments, the processor 410 may be a central processing unit (CPU) or a microcontroller unit (MCU), and the computer executable code or instructions being executed by the processor 410 may include an operating system (OS) and other applications, codes or instructions stored in the tag 400. In certain embodiments, the tag 400 may run on multiple processors, which may include any suitable number of processors.

The memory 420 may be a volatile memory module, such as the random-access memory (RAM), for storing the data and information during the operation of the tag 400. In certain embodiments, the memory 420 may be in the form of a volatile memory array. In certain embodiments, the tag 400 may run on more than one memory 420.

The network interface 425 is an interface for communication with the network. In certain embodiments, the network interface 425 may be an interface under the UWB standard. In one embodiment, the tag 400 may include multiple network interfaces 425. For example, the network interface 425 may include one or more wireless interfaces to be in wireless communication with the base stations.

The storage device 430 is a non-volatile storage media or device for storing the computer executable code or instructions, such as the OS and the software applications for the tag 400. Examples of the storage device 430 may include flash memory, memory cards, USB drives, or other types of non-volatile storage devices such as hard drives, floppy disks, optical drives, or any other types of data storage devices. In certain embodiments, the tag 400 may have more than one storage device 430, and the software applications of the tag 400 may be stored in the more than one storage device 430 separately.

Figure 4B:
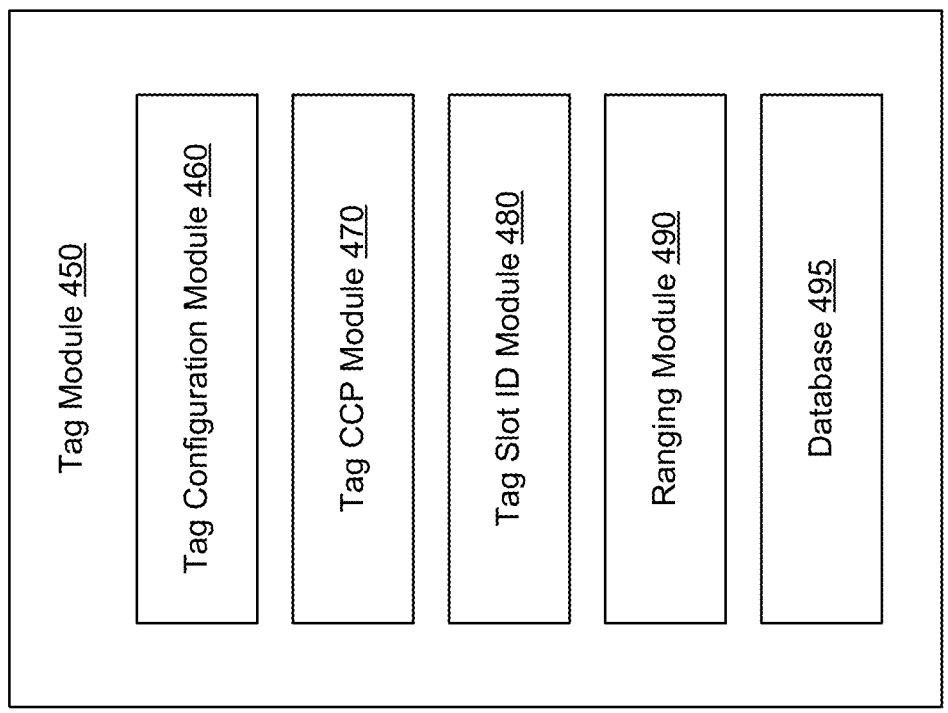
FIG. 4B shows schematically the tag module in the tag as shown in FIG. 4A according to one embodiment of the disclosure.

As shown in FIG. 4A, the computer executable code stored in the storage device 430 may include a tag module 450. Specifically, the tag module 450 is in the form of a software module which, when executed, allows the tag 400 to be in communication with the server and the base station through the base station UWB protocol. FIG. 4B shows schematically the tag module in the tag as shown in FIG. 4A according to one embodiment of the disclosure. Specifically, the tag module 450 as shown in FIG. 4B includes a tag configuration module 460, a tag CCP module 470, a tag slot ID module 480, a ranging module 490, and a database 495.

The tag configuration module 460 is used to perform the configuration setting for the tag 400. In particular, when the tag 200 reboots, the tag configuration module 260 also configures or assigns a plurality of slots in the memory 220 corresponding to the TDMA slots 310 for the base stations as shown in FIG. 3. Further, the tag configuration module 460 also creates a timer, which is used to indicate time of a corresponding one of the slots to be assigned for the tag 400. In certain embodiments, the slots for the tag 400 may include a ranging slot, a wake-up slot prior to the ranging slot, and the remaining slots as the deep sleep slots once the tag 400 has joined the network. In one embodiment, within a predetermined time frame such as 1 second, the time of the ranging slot is 6300 microseconds, which is identical to the time of each TDMA slots; and the time of the wake-up slot is 250 microseconds. Details of the slots will be further elaborated.

In certain embodiments, at the tag configuration stage, the "callback" mechanism being used by the base station as described above may also apply to the tag 400. Specifically, the tag configuration module 460 may also define a plurality of callbacks corresponding to the slots. Then, when the timer indicates beginning of the time of a specific slot, the tag configuration module 460 may trigger a corresponding callback corresponding to the specific slot. Once the tag 400 is clock synchronized with all of the base stations 200, the callback mechanism may apply to all of the base stations 200 and the tag 400, thus accurately indicating the start time of any corresponding slot.

The tag CCP module 470 is used to perform clock calibration and synchronization among the base stations 200 and the tag 400. Specifically, as discussed above, the base stations 200 may send out a clock synchronization packet (either being broadcast by the master base station or being relayed by one of the slave base stations) across the network in the CCP slot 312. At the tag 400, the tag CCP module 470 is used to receive the clock synchronization packet from the base stations 200 and to synchronize a local clock of the tag 400 with reference to the master base station based on information of the clock synchronization packet. The tag CCP module 470 also records the information of the clock synchronization packet in the database 495 to indicate that the tag 400 has been clock synchronized. Thus, the tag 400 is clock synchronized based on the information of the clock synchronization packet transmitted by the master base station (or relayed by a slave base station).

The tag slot ID module 480 is used to perform reservation for the tag to the base stations across the network. In certain embodiments, once the tag 400 is clock synchronized with the master base station, the tag slot ID module 480 is used to send a reservation request for the tag 400 to the base stations 200. Once the master base station receives the reservation request from the tag 400 (either directly from the tag 400, or from a slave base station relaying the reservation request) in the PAN identifier request slot 314, the master base station responds to the reservation request by recording the tag 400, assigning a corresponding TDMA tag slot 318 to the tag 400 sending the reservation request, and sending a corresponding reservation response back to the tag 400 in the PAN identifier response slot 316. At the tag 400, the tag slot ID module 480 receives the corresponding reservation response from the base stations (either directly from the master base station, or from a slave base station relaying the reservation response), and records the information of reservation response in the database 495 to indicate that the tag 400 has joined the network.

The ranging module 490 is used to control the ranging communication between the base stations 200 and the tag 400. Specifically, as described above, when the master base station receives the reservation request from the tag 400, the master base station responds to the reservation request by assigning a corresponding TDMA tag slot 318 to the tag 400, and the tag 400 may subsequently receive a corresponding reservation response to indicate that the tag 400 has joined the network. In certain embodiments, in each of the TDMA tag slots, the ranging module 490 sends a ranging request to the base stations 200, and then receives a corresponding ranging response from the base stations 200 with a corresponding timestamp indicating the time of the TDMA tag slot 318 corresponding to the tag 400. In this case, the ranging module 490 may perform calculation based on the corresponding timestamp to determine a wake-up time, which is a time period prior to the time of the TDMA tag slot corresponding to the tag 400. In one embodiment, the wake-up time may be 250 microseconds prior to the time of the TDMA tag slot corresponding to the tag 400. The ranging module 490 also records the information of the timestamp as well as the wake-up time obtained in the database 495. Then, the ranging module 490 may control the components of the tag 400 to enter a deep sleep mode. In the deep sleep mode, only the RTC 405 remains active, while other components of the tag 400 enter the deep sleep status, thus greatly reducing the power consumption of the tag 400. The RTC 405 will monitor the time, and when the RTC 405 indicates that the wake-up time is up, the RTC 405 sends an interrupt to wake up the tag 400, and the ranging module 490 may then proceed with performing location calculation to obtain the locating information within the TDMA tag slot corresponding to the tag 400. Once the time of the TDMA tag slot corresponding to the tag 400 is up, the ranging module 490 may control the components of the tag to re-enter the deep sleep mode.

Referring back to FIG. 3, within the same 1-second predetermined time frame, the slots 330 at each tag 400 include a ranging slot 332, a wake-up slot 334 prior to the ranging slot 332, and the remaining slots as the deep sleep slots 336. The time of the ranging slot 332 corresponds to the time of the TDMA tag slot 318 corresponding to the tag 400. Specifically, the slots 330 as shown in FIG. 3 shows the exemplary tag 400 to be labeled as TAG 1 at the base stations 200, and the time of the ranging slot 332 corresponds to the time of the TDMA tag slot 318 being labeled as TAG 1. Thus, the time period prior to the ranging slot 332 is assigned as the wake-up slot 334, and the remaining slots are assigned as the deep sleep slots 336.

In certain embodiment, for the ranging slot 332 (which corresponds to the TDMA tag slot 318 corresponding to the tag 400), the tag configuration module 460 may further configure a plurality of node slots 350 within the ranging slot 332. Specifically, the node slots sequentially includes a group poll slot 352, a plurality of base station response slots 354, a location calculation slot 356, and a data uplink slot 358. Specifically, as shown in FIG. 3, there are 16 base station response slots 354, being labeled as Base Station 0 (which indicates the master base station) through Base Station 15. In other words, a total of 16 base stations 200 or nodes (including the master base station and 15 slave base stations) may be included in the network, and the tag may be range up to be in communication with all of the 16 base stations 200. In operation, the ranging module 490 may send the corresponding ranging request to all of the base stations 200 by a group poll within the group poll slot 352. In certain embodiments, the time for the group poll slot 352 is 200 microseconds, and the overall time of the base station response slots is 4500 microseconds, with each base station response slot having a time of about 270 microseconds. In this case, if there are four (4) base stations available for the tag, the actual communication time for the ranging process is 1860 microseconds; and if there are six (6) base stations available for the tag, the actual communication time for the ranging process is 2133 microseconds, which may result in <10 cm position accuracy in the line-of sight (LOS) condition.

As discussed, once the ranging slot 332 (as well as the corresponding wake-up slot 334) has been configured for a specific tag, the tag is bound to strictly perform the ranging operation only within the time of the ranging slot 332, and the tag is switched to the deep sleep mode once the ranging slot 332 is over. Thus, the tag will consume significantly lower power.

Figure 5:
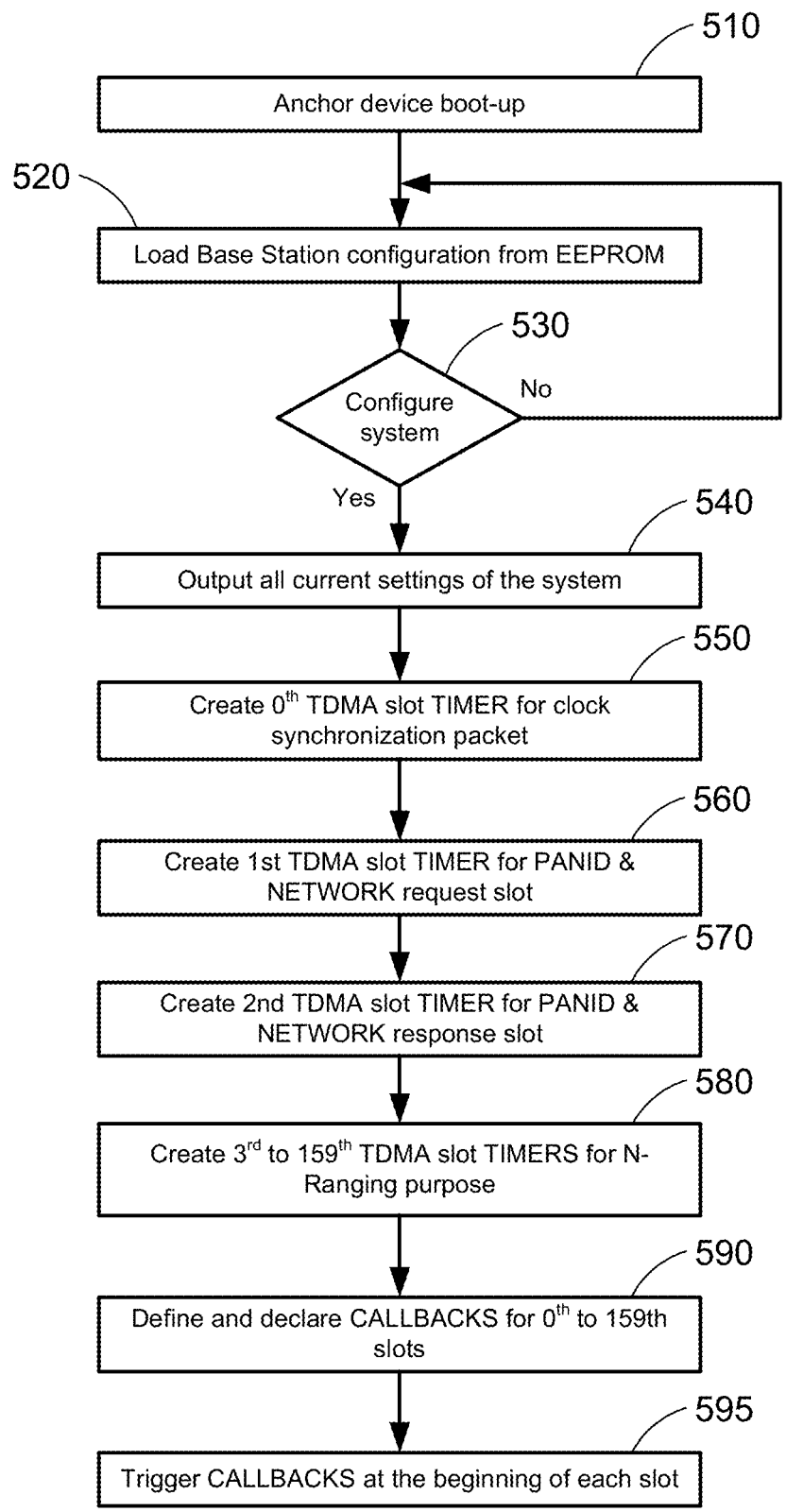
FIG. 5 shows a flowchart of a method of performing location tracking with ultra wideband (UWB) according to certain embodiments of the disclosure.

In one aspect, the system 100 as described above may be used for performing a method of performing three-dimensional high speed, centimeter accurate location tracking with UWB. For example, FIG. 5 shows a flowchart of a method of performing location tracking with ultra wideband (UWB) according to certain embodiments of the disclosure. In certain embodiments, the method as shown in FIG. 5 may be implemented by the system 100 as shown in FIG. 1A or a base station as shown in FIGS. 2A and 2B. It should be particularly noted that, unless otherwise stated in the present disclosure, the steps of the method may be arranged in a different sequential order, and are thus not limited to the sequential order as shown in FIG. 5.

As shown in FIG. 5, at process 510, the anchor device (i.e., the master base station) is booted up. Once the anchor device is booted up, at process 520, the anchor configuration module of the anchor device loads the base station configuration from the EEPROM (i.e., the storage device). At process 530, the anchor configuration module of the anchor device verifies whether there is indeed the configuration of the system. If there is no configuration, the anchor configuration module returns to the process 520 to attempt to re-load the base station configuration. In the case where the configuration is verified, at process 540, the anchor configuration module outputs the current settings of the system. In this process, the anchor configuration module may configure the TDMA slots in the memory of the anchor device. Once the TDMA slots are configured, the anchor configuration module may create the corresponding timers. At processes 550-580, the anchor configuration module sequentially creates the timers for all of the 160 TDMA slots. Specifically, at process 550, the timer corresponding to the 0th TDMA slot (i.e., the CCP slot) is created for the clock synchronization packet. At process 560, the timer corresponding to the 1st TDMA slot is created for the PAN ID & network request slot (i.e., the PAN ID request slot). At process 570, the timer corresponding to the 2nd TDMA slot is created for the PAN ID & network response slot (i.e., the PAN ID response slot). At process 580, the timers corresponding to the 3th to 159th TDMA slots are created for the N-ranging purposes (i.e., the TDMA tag slots). Once the timers are created, at process 590, the anchor configuration module defines and declares a plurality of callbacks for the 0th to 159th TDMA slots, and at process 595, the anchor configuration module sequentially triggers the callbacks at the beginning of each TDMA slot.

Figure 6A:
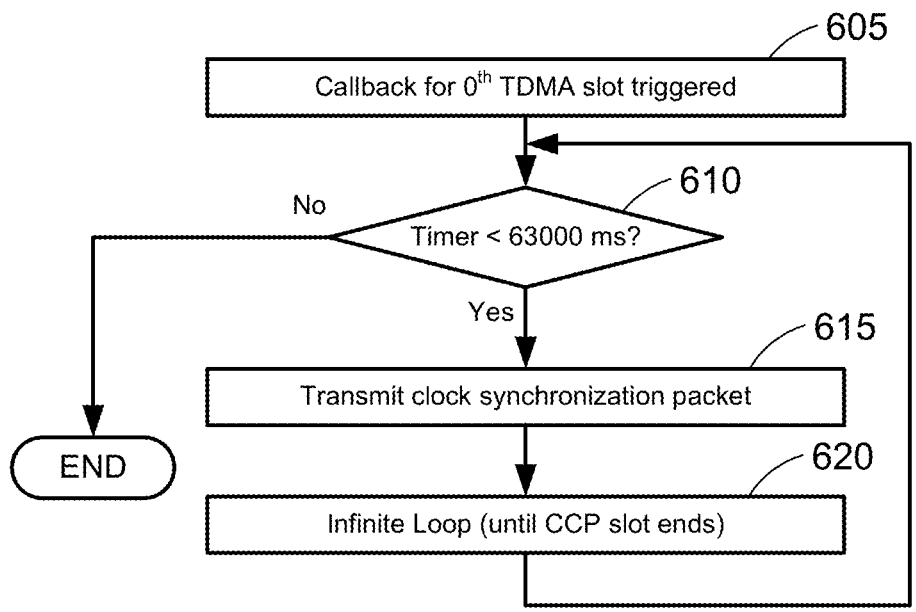
FIG. 6A shows a flowchart of operation of the master base station in response to the callback for the 0th TDMA slot according to certain embodiments of the disclosure.
Figure 6B:
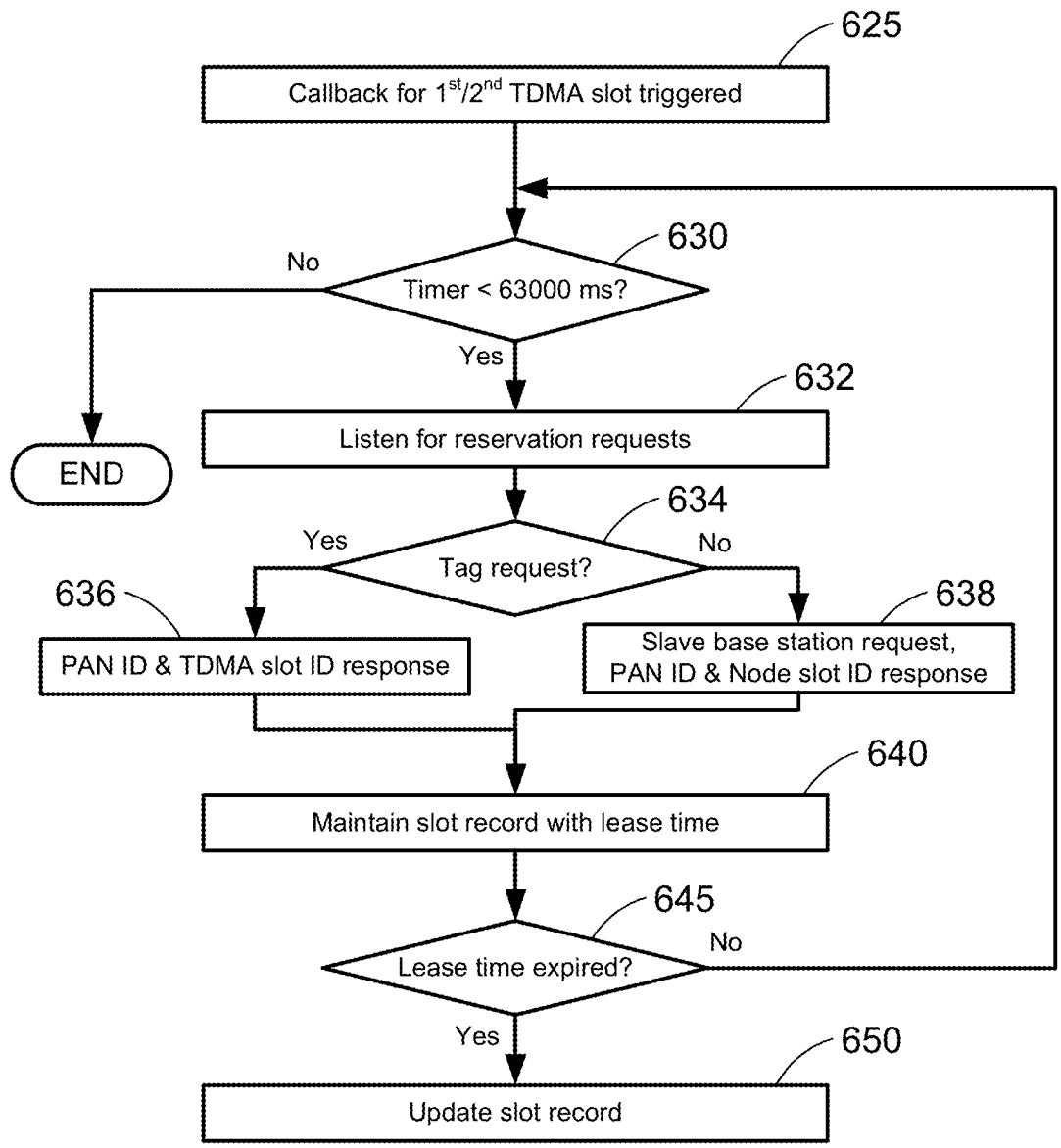
FIG. 6B shows a flowchart of operation of the master base station in response to the callbacks for the 1st and 2nd TDMA slots according to certain embodiments of the disclosure.
Figure 6C:
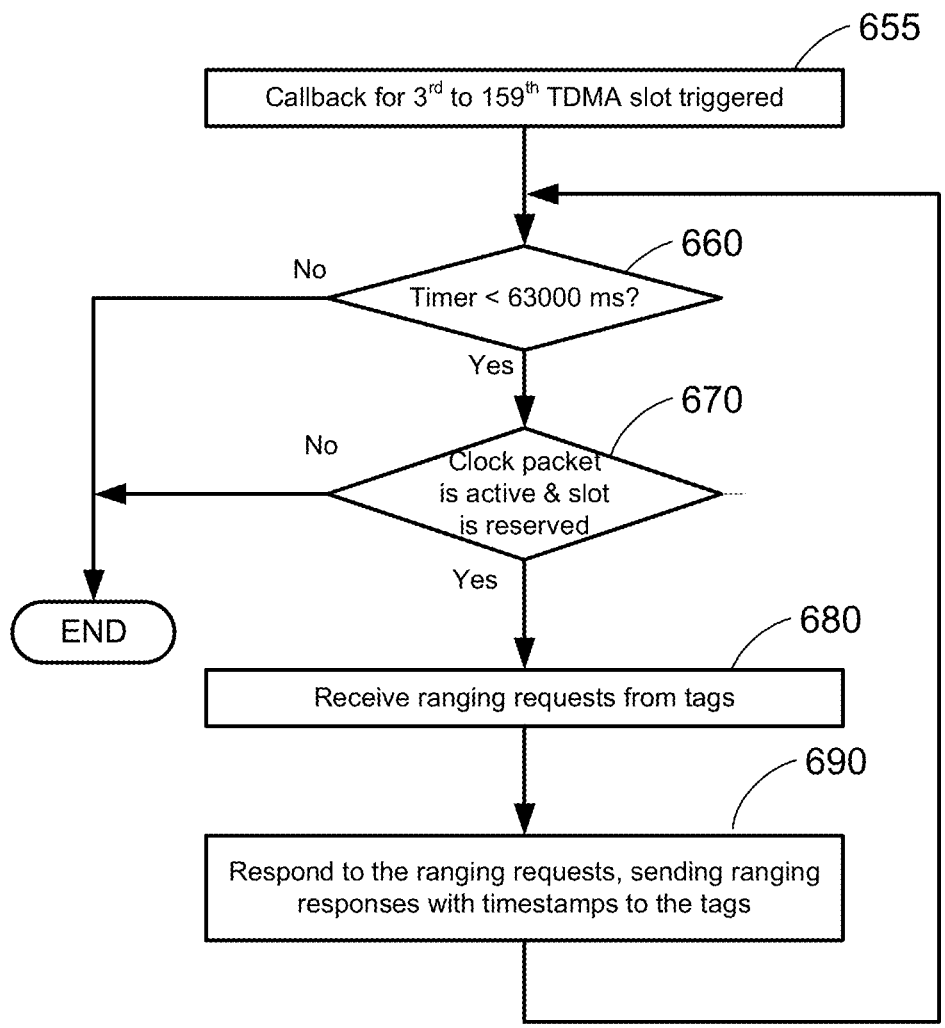
FIG. 6C shows a flowchart of operation of the master base station in response to the callbacks for the 3rd to 159th TDMA slots according to certain embodiments of the disclosure.

FIGS. 6A to 6C show flowcharts of operations of the master base station in response to the callbacks for each of the TDMA slots according to certain embodiments of the disclosure. In certain embodiments, the operations as shown in FIGS. 6A to 6C may be implemented by a base station as shown in FIGS. 2A and 2B that is configured as the master base station. It should be particularly noted that, unless otherwise stated in the present disclosure, the steps of the operations may be arranged in a different sequential order, and are thus not limited to the sequential order as shown in FIGS. 6A to 6C.

As shown in FIG. 6A, at process 605, the callback for the 0th TDMA slot (i.e., the CCP slot) is triggered. At process 610, the CCP module of the master base station checks whether the timer is less than 6300 microseconds (i.e., whether the time is still within the CCP slot). If the timer is not less than 6300 microseconds, the process ends directly. If the timer is less than 6300 microseconds, at process 615, the CCP module of the master base station transmits or broadcasts the clock synchronization packet, and at process 620, the CCP module enters an infinite loop until the CCP slot ends.

As shown in FIG. 6B, at process 625, the callbacks for the 1st and 2nd TDMA slots (i.e., the PAN ID request slot and the PAN ID response slot) are triggered. At process 630, the PAN ID & slot ID module of the master base station checks whether the timer is less than 6300 microseconds (i.e., whether the time is still within the PAN ID request slot and the PAN ID response slot). If the timer is not less than 6300 microseconds, the process ends directly. If the timer is less than 6300 microseconds, at process 632, the PAN ID & slot ID module of the master base station listens for reservation requests from the slave base stations and/or the tags. At process 634, when a reservation request is received, the PAN ID & slot ID module of the master base station determines whether the reservation request is a tag request (i.e., a reservation request from a tag). If so, at process 636, the PAN ID & slot ID module of the master base station issues a PAN ID & TDMA slot ID response (i.e., the reservation response) for the corresponding tag. If it is determined that the reservation request is not a tag request, then the reservation request is a slave base station request (i.e., a reservation request from a slave base station), and at process 638, the PAN ID & slot ID module of the master base station issues a PAN ID & node slot ID response (i.e., the reservation response) for the corresponding slave base station. Then, at process 640, the PAN ID & slot ID module of the master base station maintain the slot record with corresponding lease time. At process 645, the PAN ID & slot ID module of the master base station checks whether the lease time has expired. If not, the PAN ID & slot ID module returns to process 630. If the lease time has indeed expired, at process 650, the PAN ID & slot ID module updates the corresponding slot record, such that the corresponding slot becomes available.

As shown in FIG. 6C, at process 655, the callbacks for the 3rd to 159th TDMA slots (i.e., the TDMA tag slots) are triggered. At process 660, the TDMA module of the master base station checks whether the timer is less than 6300 microseconds (i.e., whether the time is still within each corresponding TDMA tag slot). If the timer is not less than 6300 microseconds, the process ends directly. If the timer is less than 6300 microseconds, at process 670, the TDMA module of the master base station checks whether the clock packet is active and whether any slot has been reserved (i.e., whether there is any tag being reserved). If there is no slot being reserved, the process ends directly. If at least one slot has been reserved for the tags, at process 680, the TDMA module of the master base station receives the ranging requests from the tags, and at process 690, the TDMA module of the master base station responds to the ranging requests, sending the corresponding ranging responses with timestamps to the tags. Then, the TDMA module returns to the process 660 until the corresponding TDMA tag slot ends.

Figure 7A:
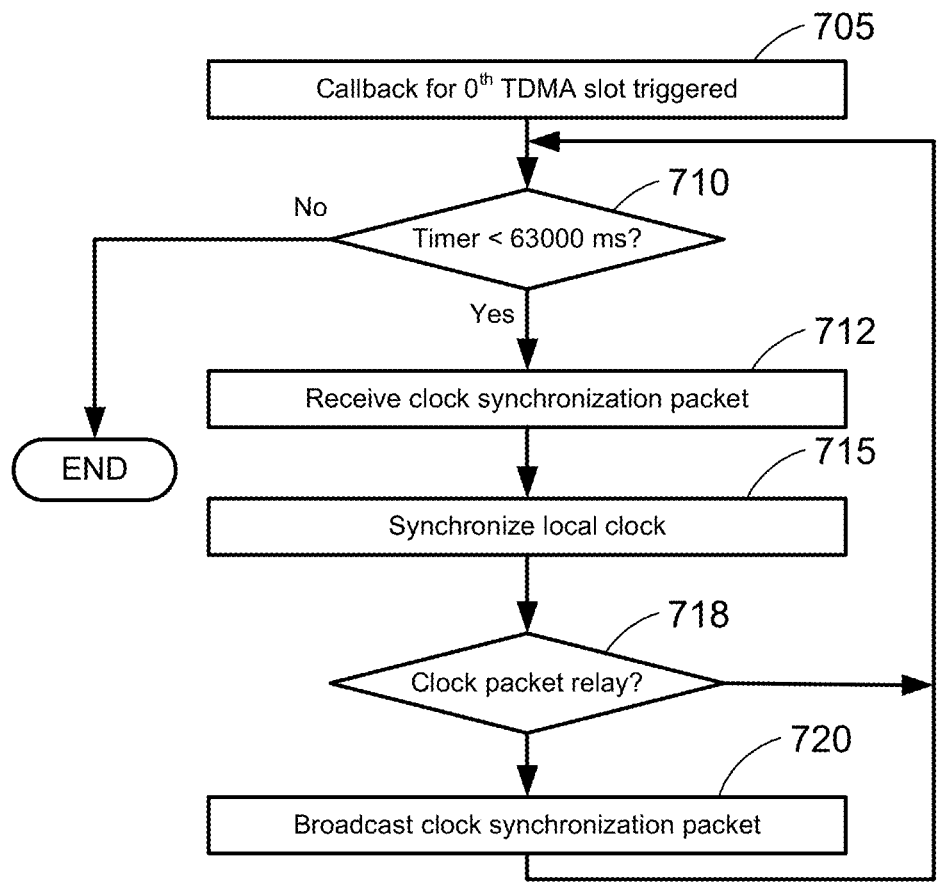
FIG. 7A shows a flowchart of operation of the slave base station in response to the callback for the 0th TDMA slot according to certain embodiments of the disclosure.
Figure 7B:
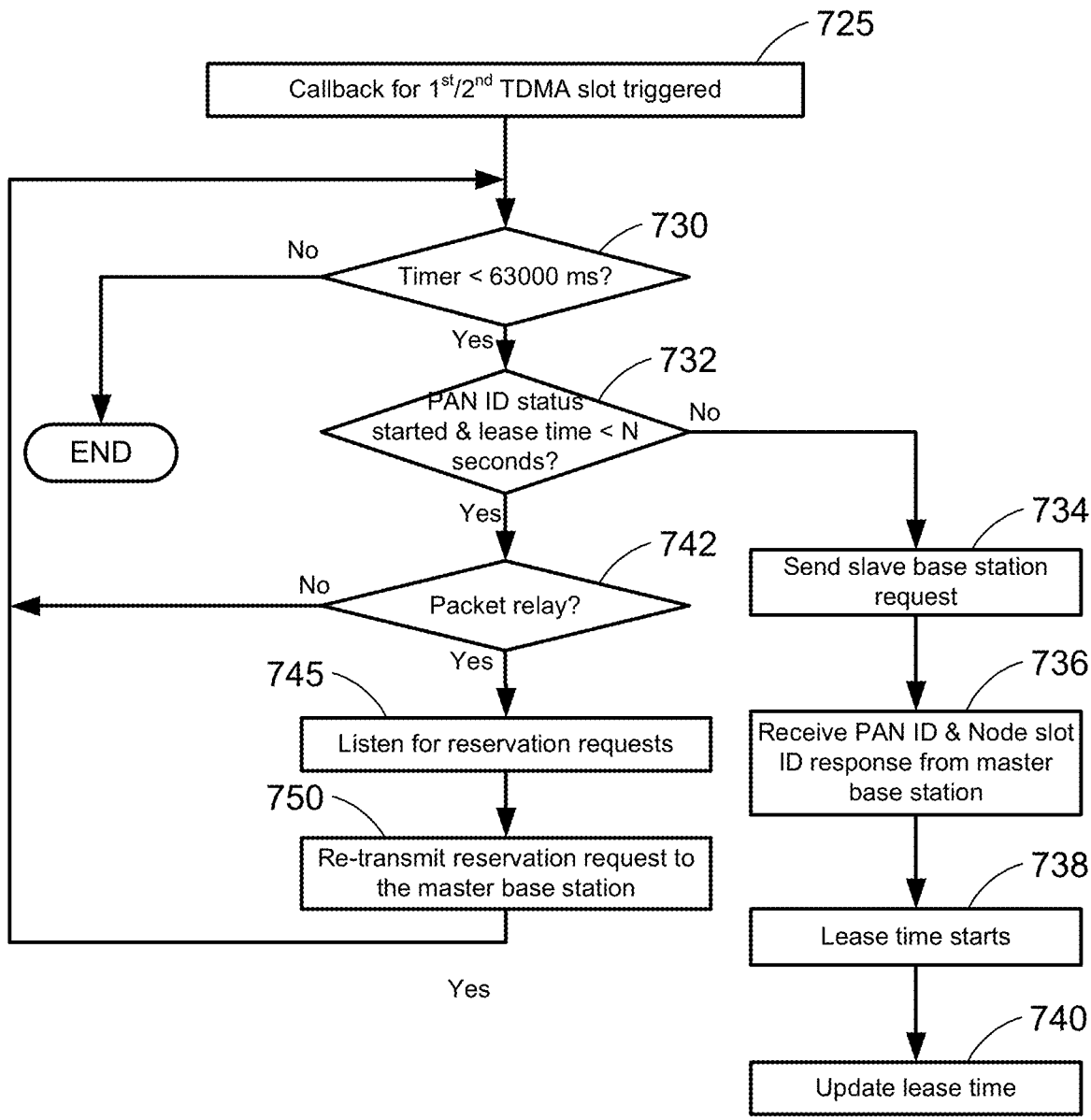
FIG. 7B shows a flowchart of operation of the slave base station in response to the callbacks for the 1st and 2nd TDMA slots according to certain embodiments of the disclosure.
Figure 7C:
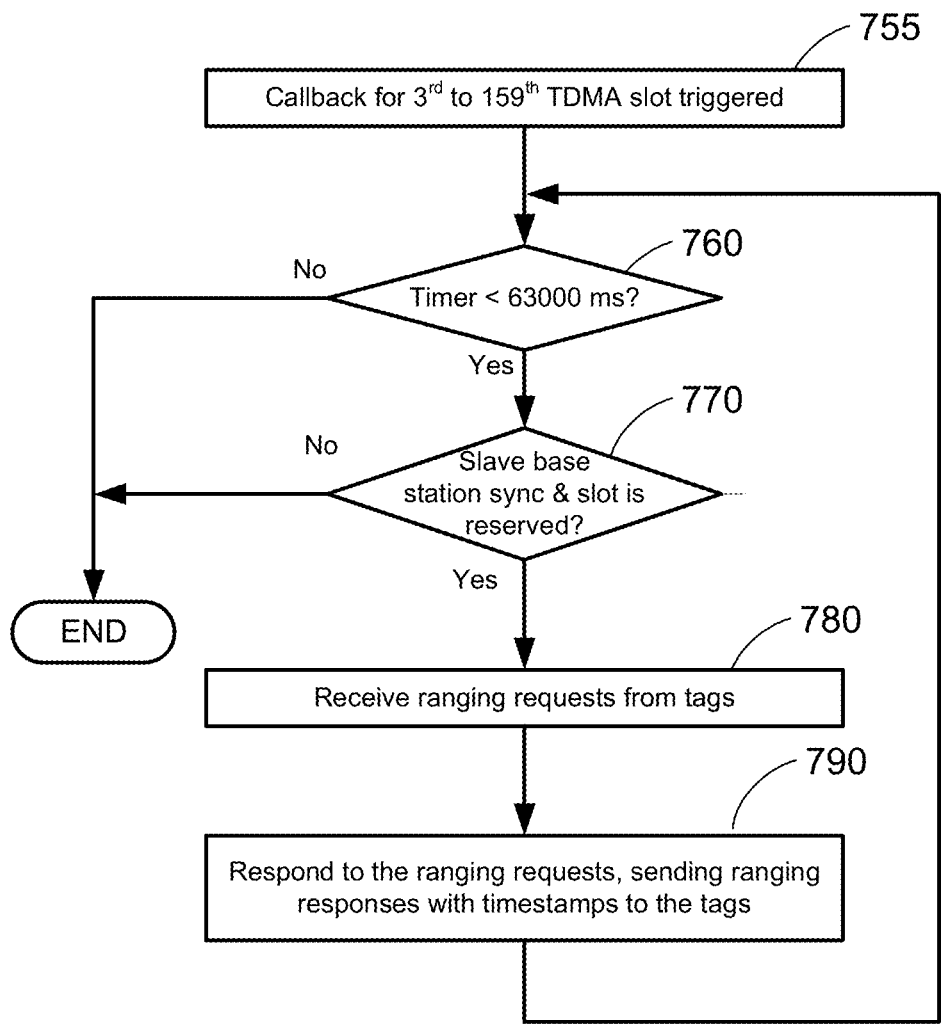
FIG. 7C shows a flowchart of operation of the slave base station in response to the callbacks for the 3rd to 159th TDMA slots according to certain embodiments of the disclosure.

FIGS. 7A to 7C show flowcharts of operations of a slave base station in response to the callbacks for each of the TDMA slots according to certain embodiments of the disclosure. In certain embodiments, the operations as shown in FIGS. 7A to 7C may be implemented by a base station as shown in FIGS. 2A and 2B that is configured as the slave base station. It should be particularly noted that, unless otherwise stated in the present disclosure, the steps of the operations may be arranged in a different sequential order, and are thus not limited to the sequential order as shown in FIGS. 7A to 7C.

As shown in FIG. 7A, at process 705, the callback for the 0th TDMA slot (i.e., the CCP slot) is triggered. At process 710, the CCP module of the slave base station checks whether the timer is less than 6300 microseconds (i.e., whether the time is still within the CCP slot). If the timer is not less than 6300 microseconds, the process ends directly. If the timer is less than 6300 microseconds, at process 712, the CCP module of the slave base station receives the clock synchronization packet, and at process 715, the CCP module of the slave base station synchronizes the local clock based on information of the clock synchronization packet, so that the slave base station is clock synchronized. Then, at process 718, the CCP module of the slave base station checks whether there is a need to relay the clock synchronization packet. If so, at process 720, the CCP module of the slave base station broadcasts or relays the clock synchronization packet, and then returns to the process 710. If there is no need to relay the clock synchronization packet, the CCP module directly returns to the process 710, until the CCP slot ends.

As shown in FIG. 7B, at process 725, the callbacks for the 1st and 2nd TDMA slots (i.e., the PAN ID request slot and the PAN ID response slot) are triggered. At process 730, the PAN ID & slot ID module of the slave base station checks whether the timer is less than 6300 microseconds (i.e., whether the time is still within the PAN ID request slot and the PAN ID response slot). If the timer is not less than 6300 microseconds, the process ends directly. If the timer is less than 6300 microseconds, at process 732, the PAN ID & slot ID module of the slave base station checks whether the PAN ID status has started, and whether the lease time is less than N seconds (indicating that the slave base station has been reserved). For example, N=3600 (i.e., the lease time is preconfigured as 1 hour). If the slave base station has not been reserved, at process 734, the PAN ID & slot ID module of the slave base station starts the reservation process by sending a reservation request to the master base station. At process 736, the PAN ID & slot ID module of the slave base station receives the corresponding PAN ID & node slot ID response (i.e., the reservation response) from the master base station. At process 738, the PAN ID & slot ID module of the slave base station starts the lease time, and at process 740, the PAN ID & slot ID module of the slave base station updates the lease time into the database of the slave base station.

On the other hand, at the process 732, if the PAN ID & slot ID module of the slave base station determines that the slave base station has been reserved, at process 742, the PAN ID & slot ID module of the slave base station determines whether there is a need to relay reservation requests. If so, at process 745, the PAN ID & slot ID module of the slave base station listens for reservation requests from other slave base stations and/or the tags. If a reservation request is received, at process 750, the PAN ID & slot ID module of the slave base station re-transmits or relays the reservation request to the master base station. If there is no need to relay the PAN ID & slot ID module of the slave base station, the PAN ID & slot ID module of the slave base station directly returns to the process 730, until the CCP slot ends.

As shown in FIG. 7C, at process 755, the callbacks for the 3rd to 159th TDMA slots (i.e., the TDMA tag slots) are triggered. At process 760, the TDMA module of the slave base station checks whether the timer is less than 6300 microseconds (i.e., whether the time is still within each corresponding TDMA tag slot). If the timer is not less than 6300 microseconds, the process ends directly. If the timer is less than 6300 microseconds, at process 770, the TDMA module of the slave base station checks whether the slave base station has been clock synchronized, and whether a slot has been reserved for the slave base station (i.e., whether the slave base station is in the network). If the slave base station is not in the network, the process ends directly. If the slave base station is in the network, at process 780, the TDMA module of the slave base station receives the ranging requests from the tags, and at process 790, the TDMA module of the slave base station responds to the ranging requests, sending the corresponding ranging responses with timestamps to the tags. Then, the TDMA module returns to the process 760 until the corresponding TDMA tag slot ends.

Figure 8A:
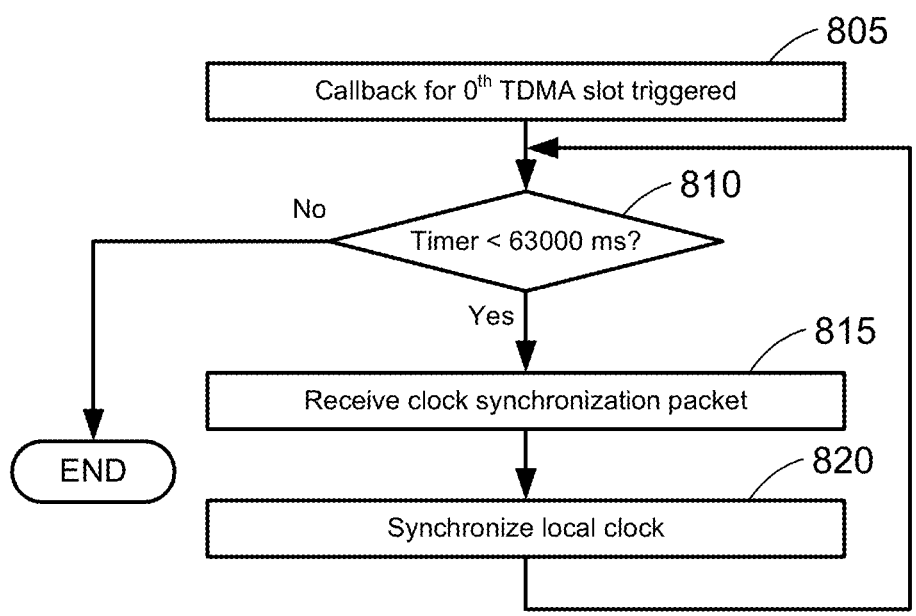
FIG. 8A shows a flowchart of operation of the tag in response to the callback for the 0th TDMA slot according to certain embodiments of the disclosure.
Figure 8B:
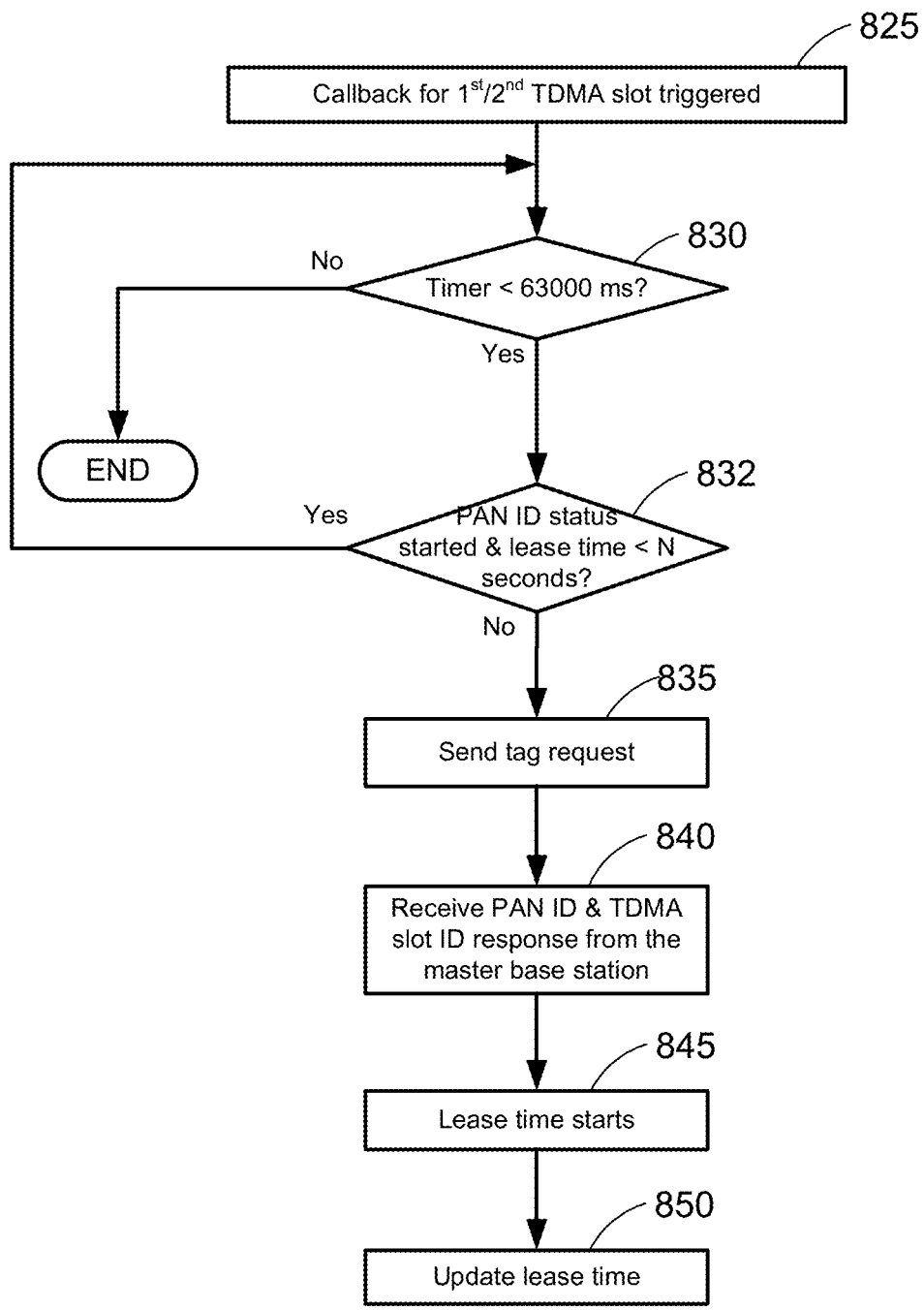
FIG. 8B shows a flowchart of operation of the tag in response to the callbacks for the 1st and 2nd TDMA slots according to certain embodiments of the disclosure.
Figure 8C:
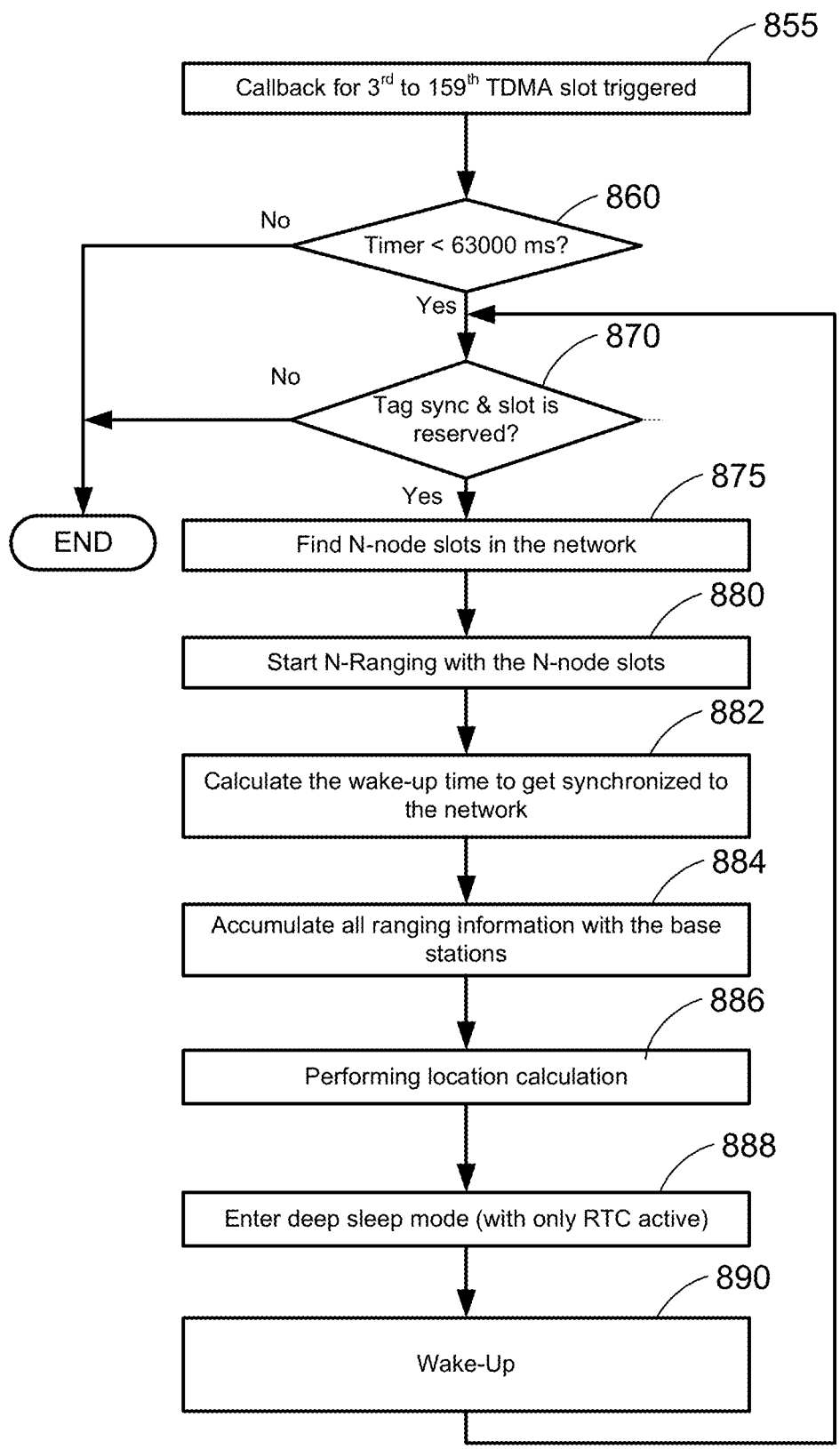
FIG. 8C shows a flowchart of operation of the tag in response to the callbacks for the 3rd to 159th TDMA slots according to certain embodiments of the disclosure.

FIGS. 8A to 8C show flowcharts of operations of a tag in response to the callbacks for each of the TDMA slots according to certain embodiments of the disclosure. In certain embodiments, the operations as shown in FIGS. 8A to 8C may be implemented by a tag as shown in FIGS. 4A and 4B. It should be particularly noted that, unless otherwise stated in the present disclosure, the steps of the operations may be arranged in a different sequential order, and are thus not limited to the sequential order as shown in FIGS. 8A to 8C.

As shown in FIG. 8A, at process 805, the callback for the 0th TDMA slot (i.e., the CCP slot) is triggered. At process 810, the tag CCP module of the tag checks whether the timer is less than 6300 microseconds (i.e., whether the time is still within the CCP slot). If the timer is not less than 6300 microseconds, the process ends directly. If the timer is less than 6300 microseconds, at process 815, the CCP module of the tag receives the clock synchronization packet, and at process 820, the CCP module of the tag synchronizes the local clock based on information of the clock synchronization packet, so that the tag is clock synchronized. Once the tag is clock synchronized, the CCP module directly returns to the process 810, until the CCP slot ends.

As shown in FIG. 8B, at process 825, the callbacks for the 1st and 2nd TDMA slots (i.e., the PAN ID request slot and the PAN ID response slot) are triggered. At process 830, the tag slot ID module of the tag checks whether the timer is less than 6300 microseconds (i.e., whether the time is still within the PAN ID request slot and the PAN ID response slot). If the timer is not less than 6300 microseconds, the process ends directly. If the timer is less than 6300 microseconds, at process 832, the tag slot ID module of the tag checks whether the PAN ID status has started, and whether the lease time is less than N seconds (indicating that the tag has been reserved). For example, N=3600 (i.e., the lease time is preconfigured as 1 hour). If the tag has not been reserved, at process 835, the tag slot ID module of the tag starts the reservation process by sending a reservation request to the master base station. At process 840, the tag slot ID module of the tag receives the corresponding PAN ID & TDMA slot ID response (i.e., the reservation response) from the master base station. At process 845, the tag slot ID module of the tag starts the lease time, and at process 850, the tag slot ID module of the tag updates the lease time into the database of the tag.

As shown in FIG. 8C, at process 855, the callbacks for the 3rd to 159th TDMA slots (i.e., the TDMA tag slots) are triggered. At process 860, the ranging module of the tag checks whether the timer is less than 6300 microseconds (i.e., whether the time is still within each corresponding TDMA tag slot). If the timer is not less than 6300 microseconds, the process ends directly. If the timer is less than 6300 microseconds, at process 870, the ranging module of the tag checks whether the tag has been clock synchronized, and whether a slot has been reserved for the slave base station (i.e., whether the tag is in the network). If the tag is not in the network, the process ends directly. If the tag is in the network, at process 875, the ranging module of the tag finds the N-node slots (i.e., the base stations) in the network (which corresponds to the group poll slot 352 as shown in FIG. 3), and at process 880, the ranging module of the tag starts the N-ranging processes with the N-node slots (i.e., the base stations). Specifically, the ranging module of the tag sends the ranging request to the base stations, and then receives a corresponding ranging response from the base stations with a corresponding timestamp indicating the time of the TDMA tag slot corresponding tag (which corresponds to the base station response slots 354 as shown in FIG. 3). In this case, at process 882, the ranging module may perform calculation based on the corresponding timestamp to determine a wake-up time in order to get synchronized to the network. At process 884, the ranging module may accumulate all ranging information with all of the base stations within their ranges. At process 886, the ranging module may perform the location calculation (which corresponds to the location calculation slot 356 as shown in FIG. 3). At process 888, the ranging module may control the components of the tag to enter the deep sleep mode, with only the RTC maintaining active (which corresponds to the deep sleep slot 336 as shown in FIG. 3). At process 890, once the next wake-up time is up (which corresponds to the wake-up slot 334 as shown in FIG. 3), the RTC performs the wake-up process, and the ranging module returns to the process 870.

In the method as described above, the tag wakes up periodically to see if it is able to range with any base station (or multiple base stations) nearby. However, it is possible that the tag is located at a position where it is out of the ranges of all base stations. In this case, if there is no ranging response for the tag, it means that there is no available base station nearby. Thus, it is possible that the clock for the tag will drift gradually as time passes. However, once the tag is back to the network (e.g., the tag moves to be within the range of at least one base station), the tag will be able to receive ranging responses from the base stations, and perform corresponding clock synchronization. If the lease time for the tag has already expired, the tag may again send another reservation request for a new TDMA tag slot to rejoin the network.

In the embodiments as discussed above, the ranging process is performed with N-ranging (using (2*N) packets, in which N refers to the quantity of anchors (i.e., the base stations) that the tag is in communication with at any point of the time for its current position. The tag operates in both transmission and reception modes at the same time. The clock synchronization packet and TDMA are used to enable the whole system to be time synchronized, and all nodes in the network are calibrated with less than 500 picoseconds clock accuracy.

Yet another aspect of the disclosure provides a non-transitory tangible computer-readable medium storing computer executable code or instructions which, when executed by one or more processors of a system (such as the base station as shown in FIGS. 2A and 2B and/or the tag as shown in FIGS. 4A and 4B), cause the above disclosed method to be performed on the base station and/or the tag. The computer executable instructions or program codes enable the above disclosed system or a similar system, to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

In certain embodiments, the system as disclosed in the embodiments as described above may provide high accuracy micro-location data, position or tracking of any tangible asset in near real-time, thus achieving precise 3D accuracy by using multiple base stations or anchors. Since all the nodes in the system are clock synchronized, packet collisions and packet drops may be avoided. The disclosure may enable the system to achieve high accuracy based on a machine learning based algorithm that takes into consideration the reflected signals and tries to eliminate the polluted data, which may be useful in high interference and non-LOS conditions.

Further, in certain embodiments, with the firmware versatility provided in the system, speed tracking solutions can be catered to specific needs through the disclosure, allowing for better control of the tracking system. In operation, real-time positioning for the tags can be as fast as 2 microseconds with 4 base stations nearby and the tags moving at a maximum speed of 60 KMph.

Moreover, as described above, the tags being used in the system may be low powered tags. Since the battery life of the tag is always a concern for customers, the disclosure enables the users to extend standard battery life by about 36 times compared to the current existing solutions (1 week to 36 weeks at the same battery capacity).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

Some references, which may include patents, patent applications, and various publications, are cited and discussed in the description of this disclosure. The citation and/or discussion of such references is provided merely to clarify the description of the disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. A system of performing location tracking with ultra wideband (UWB), comprising:
a network formed by a plurality of base stations communicatively connected to one another and to a plurality of tags, wherein one of the base stations is configured as a master base station and each of remaining ones of the base stations is configured as a slave base station, and each of the base stations has a processor and a non-transitory storage device storing first computer executable code;
wherein the first computer executable code, when executed at the processor of each of the base stations, causes the processor of each of the base stations to perform:
configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots for the tags;
creating a plurality of timers for the TDMA slots, wherein each of the timers is configured to indicate time of one of the TDMA slots;
in the CCP slot, performing clock synchronization among the base stations;
in the PAN identifier request slot,
for the master base station, listening for a reservation request from each of the slave base station and the tags; and
for the slave base station, sending the reservation request to the master base station, and relaying the reservation request from the tags to the master base station;
in the PAN identifier response slot,
for the master base station, in response to the reservation request received from each of the slave base station and the tags, recording each of the slave base station and the tags, assigning a corresponding TDMA tag slot to each of the tags sending the reservation request, and sending a corresponding reservation response respectively to each of the slave base station and the tags; and
for the slave base station, receiving the corresponding reservation response from the master base station; and
in each of the TDMA tag slots, listening to ranging requests from the tags, and in response to receiving a corresponding ranging request from a corresponding tag of the tags, sending a corresponding ranging response to the corresponding tag with a corresponding timestamp indicating the time of a TDMA tag slot corresponding to the corresponding tag.

2. The system of claim 1, wherein the predetermined time frame is 1 second, a quantity of the TDMA time slots within the predetermined time frame is 160, and the time of each of the TDMA time slots is 6300 microseconds.

3. The system of claim 1, wherein the first computer executable code, when executed at the processor of each of the base stations, causes the processor of each of the base stations to further perform:
defining a plurality of callbacks, wherein the callbacks one-to-one corresponds to the TDMA slots; and
in response to the timers indicating beginning of the time of each of the TDMA slots, triggering a corresponding one of the callbacks corresponding to the TDMA slots for the base stations and the tags.

4. The system of claim 1, wherein each of the tags has a processor, a real-time clock (RTC) and a non-transitory storage device storing second computer executable code, and wherein the second computer executable code, when executed at the processor of a specific tag of the tags, causes the processor of the specific tag to:
in the CCP slot, perform clock synchronization among the base stations and the specific tag;
in the PAN identifier request slot, send the reservation request to the base stations;
in the PAN identifier response slot, receive the corresponding reservation request from the base stations; and
in each of the TDMA tag slots,
send the corresponding ranging request to the base stations within the TDMA tag slot corresponding to the specific tag;
receive the corresponding ranging response with the corresponding timestamp from the base stations;
calculate a wake-up time based on the corresponding timestamp, wherein the wake-up time is a time period prior to the time of the TDMA tag slot corresponding to the specific tag;
enter a deep sleep mode, wherein the RTC remains active in the deep sleep mode; and
in response to the RTC indicating the wake-up time, wake up from the deep sleep mode, perform location calculation to obtain the locating information within the TDMA tag slot corresponding to the specific tag, and re-enter the deep sleep mode after the TDMA tag slot corresponding to the specific tag.

5. The system of claim 4, wherein the first computer executable code, when executed at the processor of each of the base stations, causes the processor of each of the base stations to perform clock synchronization among the base stations in the CCP slot by:
for the master base station, transmitting a clock synchronization packet; and
for the slave base station, receiving the clock synchronization packet from the master base station, synchronizing a local clock of the slave base station with reference to the master base station based on information of the clock synchronization packet, and relaying the clock synchronization packet.

6. The system of claim 5, wherein the second computer executable code, when executed at the processor of the specific tag, causes the processor of the specific tag to perform clock synchronization among the base stations and the specific tag in the CCP slot by receiving the clock synchronization packet from the base stations, and synchronizing a local clock of the specific tag with reference to the master base station based on the information of the clock synchronization packet.

7. The system of claim 4, wherein the wake-up time is 250 microseconds prior to the time of the TDMA tag slot corresponding to the specific tag.

8. The system of claim 4, wherein the second computer executable code, when executed at the processor of the specific tag, causes the processor of the specific tag to further perform:
configuring a plurality of node slots within the TDMA tag slot corresponding to the specific tag, wherein the node slots sequentially includes a group poll slot, a plurality of base station response slots, a location calculation slot, and a data uplink slot; and
within the TDMA tag slot corresponding to the specific tag,
sending the corresponding ranging request to the base stations by a group poll within the group poll slot;
receiving the corresponding ranging response from each of the base stations within a corresponding one of the base station response slots;
performing location calculation to obtain the locating information within the location calculation slot; and
uploading the locating information obtained within the data uplink slot.

9. The system of claim 8, wherein a quantity of the base station response slots within the TDMA tag slot corresponding to the specific tag is 16, the time of TDMA tag slot corresponding to the specific tag is 6300 microseconds, time of the group poll slot is 200 microseconds, and overall time of the base station response slots is 4500 microseconds.

10. A tag for performing location tracking with ultra wideband (UWB), comprising:
a processor, a real-time clock (RTC) and a non-transitory storage device storing computer executable code,
wherein the tag is communicatively connected to a network formed by a plurality of base stations, wherein one of the base stations is configured as a master base station and each of remaining ones of the base stations is configured as a slave base station;
wherein the computer executable code, when executed at the processor of the tag, causes the processor of the tag to perform:
configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots;
creating a plurality of timers for the TDMA slots, wherein each of the timers is configured to indicate time of one of the TDMA slots;
in the CCP slot, performing perform clock synchronization among the base stations and the tag;
in the PAN identifier request slot, sending a reservation request to the base stations, wherein the base stations are configured to assign a corresponding TDMA tag slot to the tag in response to the reservation request;

in the PAN identifier response slot, receiving the corresponding reservation request from the base stations; and in each of the TDMA tag slots, sending the corresponding ranging request to the base stations within the TDMA tag slot corresponding to the tag, wherein the base stations are configured to send a corresponding ranging response to the tag with a corresponding timestamp indicating the time of the TDMA tag slot corresponding to the corresponding tag;

receiving the corresponding ranging response with the corresponding timestamp from the base stations;

calculating a wake-up time based on the corresponding timestamp, wherein the wake-up time is a time period prior to the time of the TDMA tag slot corresponding to the tag;

entering a deep sleep mode, wherein the RTC remains active in the deep sleep mode; and in response to the RTC indicating the wake-up time, waking up from the deep sleep mode, performing location calculation to obtain locating information within the TDMA tag slot corresponding to the tag, and re-entering the deep sleep mode after the TDMA tag slot corresponding to the tag.

11. The tag of claim 10, wherein the computer executable code, when executed at the processor of the tag, causes the processor of the tag to perform clock synchronization among the base stations and the tag in the CCP slot by receiving a clock synchronization packet from the base stations, and synchronizing a local clock of the tag with reference to the master base station based on the information of the clock synchronization packet.

12. The tag of claim 11, wherein the clock synchronization packet is transmitted by the master base station or is relayed by the slave base station.

13. The tag of claim 10, wherein the wake-up time is 250 microseconds prior to the time of the TDMA tag slot corresponding to the specific tag.

14. The tag of claim 10, wherein the computer executable code, when executed at the processor of the tag, causes the processor of the tag to further perform:

configuring a plurality of node slots within the TDMA tag slot corresponding to the tag, wherein the node slots sequentially includes a group poll slot, a plurality of base station response slots, a location calculation slot, and a data uplink slot; and within the TDMA tag slot corresponding to the tag, sending the corresponding ranging request to the base stations by a group poll within the group poll slot;

receiving the corresponding ranging response from each of the base stations within a corresponding one of the base station response slots;

performing location calculation to obtain the locating information within the location calculation slot; and uploading the locating information obtained within the data uplink slot.

15. The tag of claim 14, wherein a quantity of the base station response slots within the TDMA tag slot corresponding to the specific tag is 16, the time of TDMA tag slot corresponding to the tag is 6300 microseconds, time of the group poll slot is 200 microseconds, and overall time of the base station response slots is 4500 microseconds.

16. A method of performing location tracking with ultra wideband (UWB), comprising:

providing a network formed by a plurality of base stations communicatively connected to one another and to a plurality of tags, wherein one of the base stations is configured as a master base station and each of remaining ones of the base stations is configured as a slave base station;

configuring a plurality of Time Division Multiple Access (TDMA) slots within a predetermined time frame, wherein the TDMA slots sequentially includes a clock calibration packet (CCP) slot, a personal area network (PAN) identifier request slot, a PAN identifier response slot, and a plurality of TDMA tag slots for the tags;

creating a plurality of timers for the TDMA slots, wherein each of the timers is configured to indicate time of one of the TDMA slots;

in the CCP slot, performing clock synchronization among the base stations and the tags;

in the PAN identifier request slot, for the master base station, listening for a reservation request from each of the slave base station and the tags; and for the slave base station, sending the reservation request to the master base station, and relaying the reservation request from the tags to the master base station;

in the PAN identifier response slot, for the master base station, in response to the reservation request received from each of the slave base station and the tags, recording each of the slave base station and the tags, assigning a corresponding TDMA tag slot to each of the tags sending the reservation request, and sending a corresponding reservation response respectively to each of the slave base station and the tags; and for the slave base station, receiving the corresponding reservation response from the master base station; and in each of the TDMA tag slots, listening, by the base stations, to ranging requests from the tags, and in response to receiving a corresponding ranging request from a corresponding tag of the tags, sending a corresponding ranging response to the corresponding tag with a corresponding timestamp indicating the time of a TDMA tag slot corresponding to the corresponding tag.

17. The method of claim 16, further comprising:

defining a plurality of callbacks, wherein the callbacks one-to-one corresponds to the TDMA slots; and in response to the timers indicating beginning of the time of each of the TDMA slots, triggering a corresponding one of the callbacks corresponding to the TDMA slots for the base stations and the tags.

18. The method of claim 16, wherein the clock synchronization among the base stations in the CCP slot is performed by:

for the master base station, transmitting a clock synchronization packet;

for the slave base station, receiving the clock synchronization packet from the master base station, synchronizing a local clock of the slave base station with reference to the master base station based on information of the clock synchronization packet, and relaying the clock synchronization packet; and for each of the tags, receiving the clock synchronization packet from the base stations, and synchronizing a local clock of each of the tags with reference to the master base station based on the information of the clock synchronization packet.

19. The method of claim 16, wherein a specific tag of the tags is configured to:
in the CCP slot, perform clock synchronization among the base stations and the specific tag;
in the PAN identifier request slot, send the reservation request to the base stations;
in the PAN identifier response slot, receive the corresponding reservation request from the base stations; and
in each of the TDMA tag slots,
send the corresponding ranging request to the base stations within the TDMA tag slot corresponding to the specific tag;
receive the corresponding ranging response with the corresponding timestamp from the base stations;
calculate a wake-up time based on the corresponding timestamp, wherein the wake-up time is a time period prior to the time of the TDMA tag slot corresponding to the specific tag;
enter a deep sleep mode, wherein a real-time clock (RTC) of the specific tag remains active in the deep sleep mode; and
in response to the RTC indicating the wake-up time, wake up from the deep sleep mode, perform location calculation to obtain the locating information within the TDMA tag slot corresponding to the specific tag, and re-enter the deep sleep mode after the TDMA tag slot corresponding to the specific tag.

20. The method of claim 19, wherein the specific tag is further configured to perform:
configuring a plurality of node slots within the TDMA tag slot corresponding to the tag, wherein the node slots sequentially includes a group poll slot, a plurality of base station response slots, a location calculation slot, and a data uplink slot; and
within the TDMA tag slot corresponding to the tag,
sending the corresponding ranging request to the base stations by a group poll within the group poll slot;
receiving the corresponding ranging response from each of the base stations within a corresponding one of the base station response slots;
performing location calculation to obtain the locating information within the location calculation slot; and
uploading the locating information obtained within the data uplink slot.

\* \* \* \* \*